US008624179B2

(12) United States Patent
Chen et al.

(10) Patent No.: US 8,624,179 B2
(45) Date of Patent: Jan. 7, 2014

(54) METHOD OF CHARGE REDUCTION OF ELECTRON TRANSFER DISSOCIATION PRODUCT IONS

(75) Inventors: Weibin Chen, Holliston, MA (US); Asish B. Chakraborty, Milford, MA (US); John Charles Gebler, Hopkinton, MA (US); Jeffery Mark Brown, Cheshire (GB)

(73) Assignee: Micromass UK Limited, Manchester (GB)

(*) Notice: Subject to any disclaimer, the term of this patent is extended or adjusted under 35 U.S.C. 154(b) by 404 days.

(21) Appl. No.: 12/995,778

(22) PCT Filed: Jun. 5, 2009

(86) PCT No.: PCT/GB2009/001421
§ 371 (c)(1), (2), (4) Date: Feb. 2, 2011

(87) PCT Pub. No.: WO2009/147411
PCT Pub. Date: Dec. 10, 2009

(65) Prior Publication Data

US 2011/0114835 A1 May 19, 2011

Related U.S. Application Data

(60) Provisional application No. 61/059,199, filed on Jun. 5, 2008.

(30) Foreign Application Priority Data

Nov. 6, 2008 (GB) .................................. 0820308.5

(51) Int. Cl.
*B01D 59/44* (2006.01)

(52) U.S. Cl.
USPC .......................................... 250/281; 250/282

(58) Field of Classification Search
None
See application file for complete search history.

(56) References Cited

U.S. PATENT DOCUMENTS

| | | | | |
|---|---|---|---|---|
| 6,127,340 | A * | 10/2000 | Green et al. | 514/13.7 |
| 6,838,662 | B2 | 1/2005 | Bateman et al. | |
| 7,319,222 | B2 | 1/2008 | Hashimoto et al. | |
| 7,518,108 | B2 | 4/2009 | Frey et al. | |
| 7,534,622 | B2 | 5/2009 | Hunt et al. | |
| 7,749,769 | B2 * | 7/2010 | Hunt et al. | 436/173 |

(Continued)

FOREIGN PATENT DOCUMENTS

| | | |
|---|---|---|
| GB | 2423631 | 8/2006 |
| GB | 2455191 | 6/2009 |

(Continued)

OTHER PUBLICATIONS

Glasovac et al.; "Gas-phase proton affinities of guanidines iwth heteroalkyl side chains", Int'l Journal of Mass Spectrometry 270 (2008) 39-46.

(Continued)

*Primary Examiner* — Andrew Smyth
(74) *Attorney, Agent, or Firm* — Diederiks & Whitelaw, PLC

(57) ABSTRACT

A mass spectrometer is disclosed wherein highly charged fragment ions resulting from Electron Transfer Dissociation fragmentation of parent ions are reduced in charge state within a Proton Transfer Reaction cell 35 by reacting the fragment ions with a neutral superbase reagent gas such as Octahydropyrimidolazepine.

15 Claims, 7 Drawing Sheets

(56) References Cited

U.S. PATENT DOCUMENTS

| | | | | |
|---|---|---|---|---|
| 7,919,747 | B2 | 4/2011 | Green et al. | |
| 7,982,069 | B2 * | 7/2011 | Jessop et al. | 564/238 |
| 8,049,169 | B2 | 11/2011 | Satake et al. | |
| 2002/0166958 | A1 | 11/2002 | Afeyan et al. | |
| 2005/0199804 | A1 * | 9/2005 | Hunt et al. | 250/290 |
| 2006/0255261 | A1 * | 11/2006 | Whitehouse et al. | 250/288 |
| 2007/0102634 | A1 * | 5/2007 | Frey et al. | 250/288 |
| 2008/0044915 | A1 * | 2/2008 | Hunt et al. | 436/89 |
| 2008/0048109 | A1 * | 2/2008 | Schwartz et al. | 250/282 |
| 2008/0058549 | A1 * | 3/2008 | Jessop et al. | 564/238 |
| 2008/0245963 | A1 * | 10/2008 | Land et al. | 250/288 |
| 2009/0045062 | A1 * | 2/2009 | Senko et al. | 204/547 |
| 2009/0173877 | A1 | 7/2009 | Bateman et al. | |
| 2010/0301206 | A1 * | 12/2010 | Brown et al. | 250/285 |
| 2011/0024618 | A1 | 2/2011 | Brown et al. | |
| 2011/0062323 | A1 * | 3/2011 | Brown et al. | 250/282 |
| 2012/0184042 | A1 | 7/2012 | Hunt et al. | |

FOREIGN PATENT DOCUMENTS

| | | |
|---|---|---|
| GB | 2461373 | 12/2010 |
| JP | 2003-315313 | 11/2003 |
| WO | 02086490 | 10/2002 |
| WO | 2006103412 | 10/2006 |

OTHER PUBLICATIONS

Strittmatter et al.; "Effects of Gas-Phase Basicity on the Proton Transfer between Organic Bases and Trifluoracetic Acid in the Gas Phase"; "Engergetics of Charge Solvaiton and Salt Bridges"; J. Phys. Chem. A. 2000, 104, 10271-10279.

He et al.; "Charge permutation reactions in tandem mass spectrometry"; J. Mass Spectrom, 2004; 39: 1231-1259.

Touboul et al.; "Investigation of Deprotonation Reactions on Globular and Denatured Proteins at Atmospheric Pressure by ESSI-MS"; J. Am. Soc. Mass Spectrom 2008, 19, 455-466.

Search/Examination Report for Application No. GB0909770.0, dated Oct. 30, 2009.

Search/Examination Report for Application No. GB1012803.1, dated Sep. 1, 2010.

Search/Examination Report for Application No. GB1105760.1, dated Apr. 26, 2011.

PCT International Search Report form ISA/220+201 for Application No. PCT/GB2009/001421, dated Nov. 26, 2009.

PCT International Written Opinion form ISA/237 for Applicaiton No. PCT/GB2009/001421, dated Nov. 26, 2009.

* cited by examiner

METHOD OF CHARGE REDUCTION OF ELECTRON TRANSFER DISSOCIATION PRODUCT IONS

CROSS REFERENCE TO RELATED APPLICATIONS

This application is the National Stage of International Application No. PCT/GB09/001421, filed Jun. 5, 2009, which claims priority to and benefit of U.S. Provisional Patent Application Ser. No. 61/059,199, filed Jun. 5, 2008, and United Kingdom Patent Application No. GB 0820308.5, filed Nov. 6 2008. The entire contents of these applications are incorporated herein by reference.

The present invention relates to a mass spectrometer and a method of mass spectrometry. The mass spectrometer is preferably arranged for charge reduction or charge stripping of Electron Transfer Dissociation ("ETD") product or fragment ions via Proton Transfer Reactions ("PTR") with gaseous neutral superbase reagents.

Electrospray ionisation ion sources are well known and may be used to convert neutral peptides eluting from an HPLC column into gas-phase analyte ions. In an aqueous acidic solution, tryptic peptides will be ionised on both the amino terminus and the side chain of the C-terminal amino acid. As the peptide ions proceed to enter a mass Spectrometer the positively charged amino groups hydrogen bond and transfer protons to the amide groups along the backbone of the peptide.

It is known to fragment peptide ions by increasing the internal energy of the peptide ions through collisions with a collision gas. The internal energy of the peptide ions is increased until the internal energy exceeds the activation energy necessary to cleave the amide linkages along the backbone of the molecule. This process of fragmenting ions by collisions with a neutral collision gas is commonly referred to as Collision Induced Dissociation ("CID"). The fragment ions which result from Collision Induced Dissociation are commonly referred to as b-type and y-type fragment or product ions, wherein b-type fragment ions contain the amino terminus plus one or more amino acid residues and y-type fragment ions contain the carboxyl terminus plus one or more amino acid residues.

Other methods of fragmenting peptides are known. An alternative method of fragmenting peptide ions is to interact the peptide ions with thermal electrons by a process known as Electron Capture Dissociation ("ECD"). Electron Capture Dissociation cleaves the peptide in a substantially different manner to the fragmentation process which is observed with Collision Induced Dissociation. In particular, Electron Capture Dissociation cleaves the backbone N—$C_\alpha$ bond or the amine bond and the resulting fragment ions which are produced are commonly referred to as c-type and z-type fragment or product ions. Electron Capture Dissociation is believed to be non-ergodic i.e. cleavage occurs before the transferred energy is distributed over the entire molecule. Electron Capture Dissociation also occurs with a lesser dependence on the nature of the neighbouring amino acid and only the N-side of proline is 100% resistive to Electron Capture Dissociation cleavage.

One advantage of fragmenting peptide ions by Electron Capture Dissociation rather than by Collision Induced Dissociation is that Collision Induced Dissociation suffers from a propensity to cleave Post Translational Modifications ("PTMs") making it difficult to identify the site of modification. By contrast, fragmenting peptide ions by Electron Capture Dissociation tends to preserve Post Translational Modifications arising from, for example, phosphorylation and glycosylation.

However, the technique of Electron Capture Dissociation suffers from the significant problem that it is necessary simultaneously to confine both positive ions and electrons at near thermal kinetic energies. Electron Capture Dissociation has been demonstrated using Fourier Transform Ion Cyclotron Resonance ("FT-ICR") mass analysers which use a superconducting magnet to generate large magnetic fields. However, such mass spectrometers are very large and are prohibitively expensive for the majority of mass spectrometry users.

As an alternative to Electron Capture Dissociation it has been demonstrated that it is possible to fragment peptide ions by reacting negatively charged reagent ions with multiply charged analyte cations in a linear ion trap. The process of reacting positively charged analyte ions with negatively charged reagent ions has been referred to as Electron Transfer Dissociation ("ETD"). Electron Transfer Dissociation is a mechanism wherein electrons are transferred from negatively charged reagent ions to positively charged analyte ions. After electron transfer, the charge-reduced peptide or analyte ion dissociates through the same mechanisms which are believed to be responsible for fragmentation by Electron Capture Dissociation i.e. it is believed that Electron Transfer Dissociation cleaves the amine bond in a similar manner to Electron Capture Dissociation. As a result, the product or fragment ions which are produced by Electron Transfer Dissociation of peptide analyte ions comprise mostly c-type and z-type fragment or product ions.

One particular advantage of Electron Transfer Dissociation is that such a process is particularly suited for the identification of post-translational modifications ("PTMs") since weakly bonded PTMs like phosphorylation or glycosylation will survive the electron induced fragmentation of the backbone of the amino acid chain.

It is known to perform Electron Transfer Dissociation by mutually confining cations and anions in a 2D linear ion trap which is arranged to promote ion-ion reactions between reagent anions and analyte cations. The cations and anions are simultaneously trapped within the 2D linear ion trap by applying an auxiliary axially confining RF pseudo-potential barrier at both ends of the 2D linear quadrupole ion trap.

Another method of performing Electron Transfer Dissociation is known wherein a fixed DC axial potential is applied at both ends of a 2D linear quadrupole ion trap in order to confine ions having a certain polarity (e.g. reagent anions) within the ion trap. Ions having an opposite polarity (e.g. analyte cations) to those confined within the ion trap are then directed into the ion trap. The analyte cations will react with the reagent anions already confined within the ion trap.

It is known that when multiply charged (analyte) cations are mixed with (reagent) anions then loosely bound electrons may be transferred from the (reagent) anions to the multiply charged (analyte) cations. Energy is released into the multiply charged cations and the multiply charged cations may be caused to dissociate. However, some of the (analyte) cations may not dissociate but may instead be reduced in charge state. The cations may be reduced in charge by one of two processes. Firstly, the cations may be reduced in charge by Electron Transfer ("ET") of electrons from the anions to the cations. Secondly, the cations may be reduced in charge by Proton Transfer ("PT") of protons from the cations to the anions. Irrespective of the process, an abundance of charged reduced product ions are observed within mass spectra and give an indication of the degree of ion-ion reactions (either ET or PT) that are occurring.

In bottom-up or top-down proteomics Electron Transfer Dissociation experiments may be performed in order to maximize the information available by maximizing the abundance of dissociated product ions within mass spectra. The degree of Electron Transfer Dissociation fragmentation depends upon the conformation of the cations (and anions) together with many other instrumental factors. It can be difficult to know a priori the optimal parameters for every anion-cation combination from an LC run.

One problem with known Electron Transfer Dissociation arrangements is that the fragment or product ions resulting from the Electron Transfer Dissociation process tend to be multiply charged and tend also to have relatively high charge states. This is problematic since highly charged fragment or product ions can be hard for a mass spectrometer to resolve. The parent or analyte ions which are fragmented by Electron Transfer Dissociation may, for example, have a charge state of $5^+$, $6^+$, $7^+$, $8^+$, $9^+$, $10^+$ or higher and the resulting fragment or product ions may, for example, have a charge state of $4^+$, $5^+$, $6^+$, $7^+$, $8^+$, $9^+$ or higher.

It is desired to address the problem of ETD product or fragment ions having relatively high charge states which is problematic for a mass spectrometer to resolve.

According to an aspect of the present invention there is provided a mass spectrometer comprising:

a first device arranged and adapted to react first ions with one or more neutral, non-ionic or uncharged superbase reagent gases or vapours in order to reduce the charge state of the first ions, wherein the first device comprises a first ion guide comprising a plurality of electrodes.

An advantage of the preferred embodiment is that once the charge state of the ions has been reduced, a mass spectrometer is then able to resolve the ions. The spectral capacity or spectral density of the resulting mass spectra is significantly improved.

The first device preferably comprises a Proton Transfer Reaction device.

According to an embodiment either: (i) protons are transferred from at least some of the first ions to the one or more neutral, non-ionic or uncharged superbase reagent gases or vapours; or (ii) protons are transferred from at least some of the first ions which comprise one or more multiply charged analyte cations or positively charged ions to the one or more neutral, non-ionic or uncharged superbase reagent gases or vapours whereupon at least some of the multiply charged analyte cations or positively charged ions are reduced in charge state.

The one or more neutral, non-ionic or uncharged superbase reagent gases or vapours are preferably selected from the group consisting of: (i) 1,1,3,3-Tetramethylguanidine ("TMG"); (ii) 2,3,4,6,7,8,9,10-Octahydropyrimidol[1,2-a]azepine {Synonym: 1,8-Diazabicyclo[5.4.0]undec-7-ene ("DBU")}; and (iii)7-Methyl-1,5,7-triazabicyclo[4.4.0]dec-5-ene ("MTBD"){Synonym: 1,3,4,6,7,8-Hexahydro-1-methyl-2H-pyrimido[1,2-a]pyrimidine}.

The first ions preferably comprise or predominantly comprise one or more of the following: (i) multiply charged ions; (ii) doubly charged ions; (iii) triply charged ions; (iv) quadruply charged ions; (v) ions having five charges; (vi) ions having six charges; (vii) ions having seven charges; (viii) ions having eight charges; (ix) ions having nine charges; (x) ions having ten charges; or (xi) ions having more then ten charges.

The first ions preferably comprise product or fragment ions resulting from the fragmentation of parent or analyte ions by Electron Transfer Dissociation, wherein the product or fragment ions comprise a majority of c-type product or fragment ions and/or z-type product or fragment ions.

In the process of Electron Transfer Dissociation either:

(a) the parent or analyte ions are fragmented or are induced to dissociate and form the product or fragment ions upon interacting with reagent ions; and/or (b) electrons are transferred from one or more reagent anions or negatively charged ions to one or more multiply charged analyte cations or positively charged ions whereupon at least some of the multiply charged analyte cations or positively charged ions are induced to dissociate and form the product or fragment ions; and/or (c) the parent or analyte ions are fragmented or are induced to dissociate and form the product or fragment ions upon interacting with neutral reagent gas molecules or atoms or a non-ionic reagent gas; and/or (d) electrons are transferred from one or more neutral, non-ionic or uncharged basic gases or vapours to one or more multiply charged analyte cations or positively charged ions whereupon at least some of the multiply charged analyte cations or positively charged ions are induced to dissociate and form the product or fragment ions; and/or (e) electrons are transferred from one or more neutral, non-ionic or uncharged superbase reagent gases or vapours to one or more multiply charged analyte cations or positively charged ions whereupon at least some of the multiply charged analyte cations or positively charged ions are induced to dissociate and form the product or fragment ions; and/or (f) electrons are transferred from one or more neutral, non-ionic or uncharged alkali metal gases or vapours to one or more multiply charged analyte cations or positively charged ions whereupon at least some of the multiply charged analyte cations or positively charged ions are induced to dissociate and form the product or fragment ions; and/or (g) electrons are transferred from one or more neutral, non-ionic or uncharged gases, vapours or atoms to one or more multiply charged analyte cations or positively charged ions whereupon at least some of the multiply charged analyte cations or positively charged ions are induced to dissociate and form the product or fragment ions, wherein the one or more neutral, non-ionic or uncharged gases, vapours or atoms are selected from the group consisting of: (i) sodium vapour or atoms; (ii) lithium vapour or atoms; (iii) potassium vapour or atoms; (iv) rubidium vapour or atoms; (v) caesium vapour or atoms; (vi) francium vapour or atoms; (vii) $C_{60}$ vapour or atoms; and (viii) magnesium vapour or atoms.

According to an embodiment either:

(a) the reagent anions or negatively charged ions are derived from a polyaromatic hydrocarbon or a substituted polyaromatic hydrocarbon; and/or (b) the reagent anions or negatively charged ions are derived from the group consisting of: (i) anthracene; (ii) 9,10 diphenyl-anthracene; (iii) naphthalene; (iv) fluorine; (v) phenanthrene; (vi) pyrene; (vii) fluoranthene; (viii) chrysene; (ix) triphenylene; (x) perylene; (xi) acridine; (xii) 2,2' dipyridyl; (xiii) 2,2' biquinoline; (xiv) 9-anthracenecarbonitrile; (xv) dibenzothiophene; (xvi) 1,10'-phenanthroline; (xvii) 9' anthracenecarbonitrile; and (xviii) anthraquinone; and/or (c) the reagent ions or negatively charged ions comprise azobenzene anions or azobenzene radical anions.

The multiply charged analyte cations or positively charged ions preferably comprise peptides, polypeptides, proteins or biomolecules.

The first ions may comprise product or fragment ions resulting from the fragmentation of parent or analyte ions by Collision Induced Dissociation, Electron Capture Dissociation or Surface Induced Dissociation, wherein the product or fragment ions comprise a majority of b-type product or fragment ions and/or y-type product or fragment ions.

According to a less preferred embodiment the first ions may comprise product or fragment ions resulting from the fragmentation of parent or analyte ions through interactions of the parent or analyte ions with a neutral alkali metal vapour or with caesium vapour.

According to an embodiment the first ions may comprise product or fragment ions resulting from the fragmentation of parent or analyte ions by Electron Detachment Dissociation wherein electrons are irradiated onto negatively charged parent or analyte ions to cause the parent or analyte ions to fragment.

The first ions preferably comprise multiply charged parent or analyte ions wherein the majority of the parent or analyte ions have not yet been subjected to fragmentation by Electron Transfer Dissociation, Collision Induced Dissociation, Electron Capture Dissociation or Surface Induced Dissociation within a vacuum chamber of the mass spectrometer.

According to an embodiment the mass spectrometer further comprises an Electron Transfer Dissociation device arranged upstream of the first device, wherein the Electron Transfer Dissociation device comprises a second ion guide comprising a plurality of electrodes.

At least some parent or analyte ions are preferably arranged to be fragmented, in use, in the Electron Transfer Dissociation device as the parent or analyte ions are transmitted through the second ion guide, wherein the parent or analyte ions comprise cations or positively charged ions.

The Electron Transfer Dissociation device preferably further comprises a control system which is arranged and adapted in a mode of operation to optimise and/or maximise the fragmentation of the parent or analyte ions as the analyte or parent ions pass through the second ion guide.

The mass spectrometer preferably further comprises an ion mobility spectrometer or separator arranged upstream of the first device and downstream of the Electron Transfer Dissociation device, wherein the ion mobility spectrometer or separator comprises a third ion guide comprising a plurality of electrodes.

The mass spectrometer preferably further comprises a DC voltage device which is arranged and adapted to apply one or more first transient DC voltages or potentials or one or more first transient DC voltage or potential waveforms to at least some of the plurality of electrodes comprising the first ion guide and/or the second ion guide and/or the third ion guide in order to drive or urge at least some ions along and/or through at least a portion of the axial length of the first ion guide and/or the second ion guide and/or the third ion guide.

The mass spectrometer preferably further comprises a RF voltage device arranged and adapted to apply a first AC or RF voltage having a first frequency and a first amplitude to at least some of the plurality of electrodes of the first ion guide and/or the second ion guide and/or the third ion guide such that, in use, ions are confined radially within the first ion guide and/or the second ion guide and/or the third ion guide, wherein either:

(a) the first frequency is selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz; and/or (b) the first amplitude is selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak; and/or (c) in a mode of operation adjacent or neighbouring electrodes are supplied with opposite phase of the first AC or RF voltage; and/or (d) the first ion guide and/or the second ion guide and/or the third ion guide comprise 1-10, 10-20, 20-30, 30-40, 40-50, 50-60, 60-70, 70-80, 80-90, 90-100 or >100 groups of electrodes, wherein each group of electrodes comprises at least 1, 2, 3, 4, 5, 6, 7, 8, 9, 10, 11, 12, 13, 14, 15, 16, 17, 18, 19 or 20 electrodes and wherein at least 1, 2, 3, 4, 5, 6, 7, 8, 9, 10, 11, 12, 13, 14, 15, 16, 17, 18, 19 or 20 electrodes in each group are supplied with the same phase of the first AC or RF voltage.

The first ion guide and/or the second ion guide and/or the third ion guide preferably comprise a plurality of electrodes having at least one aperture, wherein ions are transmitted in use through the apertures and wherein either:

(a) at least 1%, 5%, 10%, 20%, 30%, 40%, 50%, 60%, 70%, 80%, 90%, 95% or 100% of the electrodes have substantially circular, rectangular, square or elliptical apertures; and/or (b) at least 1%, 5%, 10%, 20%, 30%, 40%, 50%, 60%, 70%, 80%, 90%, 95% or 100% of the electrodes have apertures which are substantially the same first size or which have substantially the same first area and/or at least 1%, 5%, 10%, 20%, 30%, 40%, 50%, 60%, 70%, 80%, 90%, 95% or 100% of the electrodes have apertures which are substantially the same second different size or which have substantially the same second different area; and/or (c) at least 1%, 5%, 10%, 20%, 30%, 40%, 50%, 60%, 70%, 80%, 90%, 95% or 100% of the electrodes have apertures which become progressively larger and/or smaller in size or in area in a direction along the axis of the ion guide; and/or (d) at least 1%, 5%, 10%, 20%, 30%, 40%, 50%, 60%, 70%, 80%, 90%, 95% or 100% of the electrodes have apertures having internal diameters or dimensions selected from the group consisting of: (i) ≤1.0 mm; (ii) ≤2.0 mm; (iii) ≤3.0 mm; (iv) ≤4.0 mm; (v) ≤5.0 mm; (vi) ≤6.0 mm; (vii) ≤7.0 mm; (viii) ≤8.0 mm; (ix) ≤9.0 mm; (x) 10.0 mm; and (xi) >10.0 mm; and/or (e) at least 1%, 5%, 10%, 20%, 30%, 40%, 50%, 60%, 70%, 80%, 90%, 95% or 100% of the electrodes are spaced apart from one another by an axial distance selected from the group consisting of: (i) less than or equal to 5 mm; (ii) less than or equal to 4.5 mm; (iii) less than or equal to 4 mm; (iv) less than or equal to 3.5 mm; (v) less than or equal to 3 mm; (vi) less than or equal to 2.5 mm; (vii) less than or equal to 2 mm; (viii) less than or equal to 1.5 mm; (ix) less than or equal to 1 mm; (x) less than or equal to 0.8 mm; (xi) less than or equal to 0.6 mm; (xii) less than or equal to 0.4 mm; (xiii) less than or equal to 0.2 mm; (xiv) less than or equal to 0.1 mm; and (xv) less than or equal to 0.25 mm; and/or (f) at least some of the plurality of electrodes comprise apertures and wherein the ratio of the internal diameter or dimension of the apertures to the centre-to-centre axial spacing between adjacent electrodes is selected from the group consisting of: (i) <1.0; (ii) 1.0-1.2; (iii) 1.2-1.4; (iv) 1.4-1.6; (v) 1.6-1.8; (vi) 1.8-2.0; (vii) 2.0-2.2; (viii) 2.2-2.4; (ix) 2.4-2.6; (x) 2.6-2.8; (xi) 2.8-3.0; (xii) 3.0-3.2; (xiii) 3.2-3.4; (xiv) 3.4-3.6; (xv) 3.6-3.8; (xvi) 3.8-4.0; (xvii) 4.0-4.2; (xviii) 4.2-4.4; (xix) 4.4-4.6; (xx) 4.6-4.8; (xxi) 4.8-5.0; and (xxii) >5.0; and/or (g) the internal diameter of the apertures of the plurality of electrodes progressively increases or decreases and then progressively decreases or increases one or more times along the longitudinal axis of the first ion guide and/or the second ion guide and/or the third ion guide; and/or (h) the plurality of electrodes define a geometric volume, wherein the geometric volume is selected from the group consisting of: (i) one or more spheres; (ii) one or more oblate spheroids; (iii) one or more prolate spheroids; (iv) one or more ellipsoids; and (v) one or more scalene ellipsoids; and/or (i) the first ion guide and/or the second ion guide and/or the third ion guide has a length selected from the group consisting of: (i) <20 mm; (ii) 20-40 mm; (iii) 40-60 mm; (iv) 60-80 mm; (v) 80-100 mm; (vi) 100-120 mm; (vii) 120-140 mm; (viii) 140-160 mm; (ix) 160-180 mm; (x) 180-200 mm; and (xi) >200 mm; and/or (j) the first ion guide and/or the second ion guide and/or the third ion guide comprises at least: (i) 1-10 electrodes; (ii) 10-20 electrodes; (iii) 20-30 electrodes; (iv) 30-40 electrodes; (v) 40-50 electrodes; (vi) 50-60 electrodes; (vii) 60-70 electrodes; (viii) 70-80 electrodes; (ix) 80-90 electrodes; (x)90-100 electrodes; (xi) 100-110 electrodes; (xii) 110-120 electrodes; (xiii) 120-130 electrodes; (xiv) 130-140 electrodes; (xv) 140-150 electrodes; (xvi) 150-160 electrodes; (xvii) 160-170 electrodes; (xviii) 170-180 electrodes; (xix) 180-190 electrodes; (xx) 190-200 electrodes; and (xxi) >200 electrodes; and/or (k) at least 1%, 5%, 10%, 20%, 30%, 40%, 50%, 60%, 70%, 80%, 90%, 95% or 100% of the plurality of electrodes have a thickness or axial length selected from the group consisting of: (i) less than or equal to 5 mm; (ii) less than or equal to 4.5 mm; (iii) less than or equal to 4 mm; (iv) less than or equal to 3.5 mm; (v) less than or equal to 3 mm; (vi) less than or equal to 2.5 mm; (vii) less than or equal to 2 mm; (viii) less than or equal to 1.5 mm; (ix) less than or equal to 1 mm; (x) less than or equal to 0.8 mm; (xi) less than or equal to 0.6 mm; (xii) less than or equal to 0.4 mm; (xiii) less than or equal to 0.2 mm; (xiv) less than or equal to 0.1 mm; and (xv) less than or equal to 0.25 mm; and/or (l) the pitch or axial spacing of the plurality of electrodes progressively decreases or increases one or more times along the longitudinal axis of the first ion guide and/or the second ion guide and/or the third ion guide.

The first ion guide and/or the second ion guide and/or the third ion guide preferably comprise either:

(a) a plurality of segmented rod electrodes; or (b) one or more first electrodes, one or more second electrodes and one or more layers of intermediate electrodes arranged in a plane in which ions travel in use, wherein the one or more layers of intermediate electrodes are arranged between the one or more first electrodes and the one or more second electrodes, wherein the one or more layers of intermediate electrodes comprise one or more layers of planar or plate electrodes, and wherein the one or more first electrodes are the uppermost electrodes and the one or more second electrodes are the lowermost electrodes.

According to an embodiment:

(a) a static ion-neutral gas reaction region or reaction volume is formed or generated in the first ion guide; or (b) a dynamic or time varying ion-neutral gas reaction region or reaction volume is formed or generated in the first ion guide.

The mass spectrometer preferably further comprises a device arranged and adapted either:

(a) to maintain the first ion guide and/or the second ion guide and/or the third ion guide in a mode of operation at a pressure selected from the group consisting of: (i) <100 mbar; (ii) <10 mbar; (iii) <1 mbar; (iv) <0.1 mbar; (v) <0.01 mbar; (vi) <0.001 mbar; (vii) <0.0001 mbar; and (viii) <0.00001 mbar; and/or (b) to maintain the first ion guide and/or the second ion guide and/or the third ion guide in a mode of operation at a pressure selected from the group consisting of: (i) >100 mbar; (ii) >10 mbar; (iii) >1 mbar; (iv) >0.1 mbar; (v) >0.01 mbar; (vi) >0.001 mbar; and (vii) >0.0001 mbar; and/or (c) to maintain the first ion guide and/or the second ion guide and/or the third ion guide in a mode of operation at a pressure selected from the group consisting of: (i) 0.0001-0.001 mbar; (ii) 0.001-0.01 mbar; (iii) 0.01-0.1 mbar; (iv) 0.1-1 mbar; (v) 1-10 mbar; (vi) 10-100 mbar; and (vii) 100-1000 mbar.

According to an embodiment:

(a) the residence, transit or reaction time of at least 1%, 5%, 10%, 20%, 30%, 40%, 50%, 60%, 70%, 80%, 90%, 95% or 100% of ions within the first ion guide and/or the second ion guide and/or the third ion guide is selected from the group consisting of: (i) <1 ms; (ii) 1-5 ms; (iii) 5-10 ms; (iv) 10-15 ms; (v) 15-20 ms; (vi) 20-25 ms; (vii) 25-30 ms; (viii) 30-35 ms; (ix) 35-40 ms; (x) 40-45 ms; (xi) 45-50 ms; (xii) 50-55 ms; (xiii) 55-60 ms; (xiv) 60-65 ms; (xv) 65-70 ms; (xvi) 70-75 ms; (xvii) 75-80 ms; (xviii) 80-85 ms; (xix) 85-90 ms; (xx) 90-95 ms; (xxi) 95-100 ms; (xxii) 100-105 ms; (xxiii) 105-110 ms; (xxiv) 110-115 ms; (xxv) 115-120 ms; (xxvi) 120-125 ms; (xxvii) 125-130 ms; (xxviii) 130-135 ms; (xxix) 135-140 ms; (xxx) 140-145 ms; (xxxi) 145-150 ms; (xxxii) 150-155 ms; (xxxiii) 155-160 ms; (xxxiv) 160-165 ms; (xxxv) 165-170 ms; (xxxvi) 170-175 ms; (xxxvii) 175-180 ms; (xxxviii) 180-185 ms; (xxxix) 185-190 ms; (xl) 190-195 ms; (xli) 195-200 ms; and (xlii) >200 ms; and/or (b) the residence, transit or reaction time of at least 1%, 5%, 10%, 20%, 30%, 40%, 50%, 60%, 70%, 80%, 90%, 95% or 100% of product or fragment ions created or formed within the second ion guide is selected from the group consisting of: (i) <1 ms; (ii) 1-5 ms; (iii) 5-10 ms; (iv) 10-15 ms; (v) 15-20 ms; (vi) 20-25 ms; (vii) 25-30 ms; (viii) 30-35 ms; (ix) 35-40 ms; (x) 40-45 ms; (xi) 45-50 ms; (xii) 50-55 ms; (xiii) 55-60 ms; (xiv) 60-65 ms; (xv) 65-70 Ms; (xvi) 70-75 ms; (xvii) 75-80 ms; (xviii) 80-85 ms; (xix) 85-90 ms; (xx) 90-95 ms; (xxi) 95-100 ms; (xxii) 100-105 ms; (xxiii) 105-110 ms; (xxiv) 110-115 ms; (xxv) 115-120 ms; (xxvi) 120-125 ms; (xxvii) 125-130 ms; (xxviii) 130-135 ms; (xxix) 135-140 ms; (xxx) 140-145 ms; (xxxi) 145-150 ms; (xxxii) 150-155 ms; (xxxiii) 155-160 ms; (xxxiv) 160-165 ms; (xxxv) 165-170 ms; (xxxvi) 170-175 ms; (xxxvii) 175-180 ms; (xxxviii) 180-185 ms; (xxxix) 185-190 ms; (xl) 190-195 ms; (xli) 195-200 ms; and (xlii) >200 ms; and/or (c) the first ion guide and/or the second ion guide and/or the third ion guide has a cycle time selected from the group consisting of: (i) <1 ms; (ii) 1-10 ms; (iii) 10-20 ms; (iv) 20-30 ms; (v) 30-40 ms; (vi) 40-50 ms; (vii) 50-60 ms; (viii) 60-70 ms; (ix) 70-80 ms; (x) 80-90 ms; (xi) 90-100 ms; (xii) 100-200 ms; (xiii) 200-300 ms; (xiv) 300-400 ms; (xv) 400-500 ms; (xvi) 500-600 ms; (xvii) 600-700 ms; (xviii) 700-800 ms; (xix) 800-900 ms; (xx) 900-1000 ms; (xxi) 1-2 s; (xxii) 2-3 s; (xxiii) 3-4 s; (xxiv) 4-5 s; and (xxv) >5 s.

According to an embodiment:

(a) in a mode of operation ions are arranged and adapted to be trapped but not substantially fragmented and/or reacted and/or charge reduced within the first ion guide and/or the second ion guide and/or the third ion guide; and/or (b) in a mode of operation ions are arranged and adapted to be collisionally cooled or substantially thermalised within the first ion guide and/or the second ion guide and/or the third ion guide; and/or (c) in a mode of operation ions are arranged and adapted to be substantially fragmented and/or reacted and/or charge reduced within the first ion guide and/or the second ion guide and/or the third ion guide; and/or (d) in a mode of operation ions are arranged and adapted to be pulsed into and/or out of the first ion guide and/or the second ion guide and/or the third ion guide by means of one or more electrodes arranged at the entrance and/or exit of the first ion guide and/or the second ion guide and/or the third ion guide.

The mass spectrometer preferably further comprises:

(a) an ion source arranged upstream of the first device, wherein the ion source is selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; and (xx) a Glow Discharge ("GD") ion source; and/or (b) one or more continuous or pulsed ion sources; and/or (c) one or more ion guides arranged upstream and/or downstream of the first device; and/or (d) one or more ion mobility separation devices and/or one or more Field Asymmetric Ion Mobility Spectrometer devices arranged upstream and/or downstream of the first device; and/or (e) one or more ion traps or one or more ion trapping regions arranged upstream and/or downstream of the first device; and/or (f) one or more collision, fragmentation or reaction cells arranged upstream and/or downstream of the first device, wherein the one or more collision, fragmentation or reaction cells are selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (x) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers arranged upstream and/or downstream of the first device; and/or (i) one or more ion detectors arranged upstream and/or downstream of the first device; and/or (j) one or more mass filters arranged upstream and/or downstream of the first device, wherein the one or more mass filters are selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wein filter; and/or (k) a device or ion gate for pulsing ions into the first device; and/or (l) a device for converting a substantially continuous ion beam into a pulsed ion beam.

The mass spectrometer preferably further comprises:

(a) one or more Atmospheric Pressure ion sources for generating analyte ions and/or reagent ions; and/or (b) one or more Electrospray ion sources for generating analyte ions and/or reagent ions; and/or (c) one or more Atmospheric Pressure Chemical ion sources for generating analyte ions and/or reagent ions; and/or (d) one or more Glow Discharge ion sources for generating analyte ions and/or reagent ions.

According to an embodiment one or more Glow Discharge ion sources for generating analyte ions and/or reagent ions are provided in one or more vacuum chambers of the mass spectrometer.

According to an embodiment the mass spectrometer further comprises:

a C-trap; and an orbitrap mass analyser comprising an outer barrel-like electrode and a coaxial inner spindle-like electrode;

wherein in a first mode of operation ions are transmitted to the C-trap and are then injected into the orbitrap mass analyser; and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the orbitrap mass analyser.

The mass spectrometer preferably comprises:

a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an aspect of the present invention there is provided a computer program executable by the control system of a mass spectrometer comprising a first device comprising a first ion guide comprising a plurality of electrodes, the computer program being arranged to cause the control system:

to cause first ions to react with one or more neutral, non-ionic or uncharged superbase reagent gases or vapours within the first ion guide in order to reduce the charge state of the first ions.

According to an aspect of the present invention there is provided a computer readable medium comprising computer executable instructions stored on the computer readable medium, the instructions being arranged to be executable by a control system of a mass spectrometer comprising a first device comprising a first ion guide comprising a plurality of electrodes, the computer program being arranged to cause the control system:

to cause first ions to react with one or more neutral, non-ionic or uncharged superbase reagent gases or vapours within the first ion guide in order to reduce the charge state of the first ions.

The computer readable medium is selected from the group consisting of: (i) a ROM; (ii) an EAROM; (iii) an EPROM; (iv) an EEPROM; (v) a flash memory; (vi) an optical disk; (vii) a ROM; and (viii) a hard disk drive.

According to an aspect of the present invention there is provided a method of mass spectrometry comprising:

providing a first device comprising a first ion guide comprising a plurality of electrodes; and reacting first ions with one or more neutral, non-ionic or uncharged superbase reagent gases or vapours in order to reduce the charge state of the first ions.

According to an aspect of the present invention there is provided a mass spectrometer comprising:

an Electron Transfer Dissociation device arranged and adapted to react parent or analyte ions with one or more neutral, non-ionic or uncharged reagent gases or vapours in order to cause the parent or analyte ions to fragment by Electron Transfer Dissociation.

The neutral, non-ionic or uncharged reagent gas or vapour may comprise an alkali metal vapour.

The neutral, non-ionic or uncharged reagent gas or vapour may comprise caesium vapour.

According to an aspect of the present invention there is provided a method of mass spectrometry comprising:

providing an Electron Transfer Dissociation device; and reacting parent or analyte ions with one or more neutral, non-ionic or uncharged reagent gases or vapours within the Electron Transfer Dissociation device in order to cause the parent or analyte ions to fragment by Electron Transfer Dissociation.

The neutral, non-ionic or uncharged reagent gas or vapour may comprise an alkali metal vapour.

The neutral, non-ionic or uncharged reagent gas or vapour may comprise caesium vapour.

According to an aspect of the present invention there is provided a mass spectrometer comprising:

a first device arranged and adapted to react first ions with one or more neutral, non-ionic or uncharged first reagent gases or vapours in order to reduce the charge state of the first ions, wherein the first device comprises a first ion guide comprising a plurality of electrodes.

The first reagent gas or vapour may comprise a volatile amine. According to an embodiment the first reagent gas or vapour may comprise trimethyl amine, triethyl amine or another amine.

According to an aspect of the present invention there is provided a method of mass spectrometry comprising:

providing a first device comprising a first ion guide comprising a plurality of electrodes; and reacting first ions with one or more neutral, non-ionic or uncharged first reagent gases or vapours in order to reduce the charge state of the first ions.

The first reagent gas or vapour preferably comprises trimethyl amine or triethyl amine.

The various aspects of the embodiment described above relating to the use of a superbase reagent gas apply equally to the embodiment described above which relates to the use of a non-superbased reagent gas or reagent vapour relating to an amine.

According to the preferred embodiment product or fragment ions resulting from Electron Transfer Dissociation (or less preferably another fragmentation process) are preferably reacted with a non-ionic or uncharged basic gas or superbase reagent gas in a Proton Transfer Reaction device. The product or fragment ions are preferably reacted with the superbase reagent gas in a gas phase collision cell of a mass spectrometer. The superbase reagent gas preferably has the effect of reducing the charge state of the product or fragment ions. This is particularly advantageous in that reducing the charge state of the product or fragment ions has the effect of significantly simplifying and improving the quality of resulting product or fragment ion mass spectral data. In particular, the spectral capacity or spectral density of the mass spectral data is significantly improved. Lowering the charge state of the product or fragment ions preferably reduces the mass resolution requirements of the mass spectrometer since less resolving power is needed to determine the product ion charge states and hence the product ion masses or mass to charge ratios.

Another advantageous feature of the preferred embodiment is that by reducing the charge state of the product or fragment ions, the product or fragment ions become distributed at higher mass to charge ratio values in the resulting mass spectrum with the result that there is a greater degree of separation on the mass or mass to charge ratio scale thereby improving mass resolution and spectral density hence identification of the product or fragment ions.

The use of non-ionic or neutral reagent vapours to perform charge reduction of the product or fragment ions by Proton Transfer Reaction is also particularly advantageous since a reagent ion source is not required in order to perform the PTR charge reduction process. Furthermore, the use of a neutral reagent gas as opposed to reagent ions in order to reduce the charge of the product or fragment ions eliminates any difficulties associated with reagent ion transfer and containment of reagent ions within the RF fields of a collision cell.

According to an embodiment parent or analyte ions are caused to interact with reagent ions within an ETD device which is preferably arranged upstream of a preferred PTR device containing a neutral superbase reagent gas. The resulting ETD product or fragment ions preferably emerge from the ETD device and are preferably temporally separated as they are transmitted through an ion mobility separator or spectrometer. The ETD product or fragment ions are then preferably passed to a PTR device according to the preferred embodiment wherein the ETD product or fragment ions are preferably reduced in charge state within the PTR device by interacting with the neutral reagent gas.

The ETD device and/or the PTR device according to the preferred embodiment may comprise two adjacent ion tunnel sections. The electrodes in the first ion tunnel section may have a first internal diameter and the electrodes in the second section may have a second different internal diameter (which according to an embodiment may be smaller or larger than the first internal diameter). The first and/or second ion tunnel sections may be inclined to or may otherwise be arranged off-axis from the general central longitudinal axis of the mass spectrometer. This allows ions to be separated from neutral particles which will continue to move linearly through the vacuum chamber.

Different species of cations and/or reagent ions may be input into the ETD device from opposite ends of the ETD device.

The mass spectrometer may comprise a dual mode ion source or a twin ion source. For example, an Electrospray ion source may be used to generate positive analyte ions and an Atmospheric Pressure Chemical Ionisation ion source may be used to generate negative reagent ions which are transferred to the ETD device in order to fragment the analyte ions by ETD. Alternative embodiments are also contemplated wherein a single ion source such as an Electrospray ion source, an Atmospheric Pressure Chemical Ionisation ion source or a Glow Discharge ion source may be used to generate analyte ions and/or reagent ions which are then transferred to the ETD device.

At least some multiply charged analyte cations are preferably caused to interact with at least some reagent ions within the ETD device wherein at least some electrons are preferably transferred from the reagent anions to at least some of the multiply charged analyte cations whereupon at least some of the multiply charged analyte cations are preferably induced to dissociate to form ETD product or fragment ions within the ETD device. The resulting ETD product or fragment ions tend to have a relatively high charge state which is problematic since the resolution of the mass analyser may be insufficient to resolve the ETD product or fragment ions having a relatively high charge state.

The preferred embodiment relates to an ion-neutral gas reaction device or PTR device which is preferably arranged to reduce the charge state of the ETD product or fragment ions. According to less preferred embodiments the PTR device may be arranged to reduce the charge state of product or fragment ions resulting from a fragmentation process other than ETD. The PTR device may also be arranged to reduce the charge state of parent or analyte ions having a relatively high charge state. The PTR device according to the preferred embodiment comprises a plurality of electrodes wherein one or more travelling wave or electrostatic fields may be preferably applied to the electrodes of the RF ion guide which preferably forms the PTR device. The RF ion guide preferably comprises a plurality of electrodes having apertures through which ions are transmitted in use. The one or more travelling wave or electrostatic fields preferably comprise one or more transient DC voltages or potentials or one or more transient DC voltage or potential waveforms which are preferably applied to the electrodes of the ion guide forming the preferred PTR device.

According to an embodiment the mass spectrometer may be arranged to spatially manipulate ions having opposing charges in order to facilitate and preferably maximise, optimise or minimise ion-ion reactions within an ETD device which is preferably arranged upstream of the preferred PTR device. The mass spectrometer is preferably arranged and adapted to perform Electron Transfer Dissociation ("ETD") fragmentation and/or Proton Transfer Reaction ("PTR") charge state reduction of ions.

Negatively charged reagent ions (or neutral reagent gas) may be loaded into or otherwise provided or located in an ion-ion reaction (or ion-neutral gas) ETD device which is preferably arranged upstream of the PTR device according to the preferred embodiment. The negatively charged reagent ions may, for example, be transmitted into the ETD device by applying a DC travelling wave or one or more transient DC voltages or potentials to the electrodes forming the ETD device.

Once reagent anions (or neutral reagent gas) has been loaded into the ETD device, multiply charged analyte cations may then be driven or urged through or into the ETD device preferably by means of one or more subsequent or separate DC travelling waves. The one or more DC travelling waves are preferably applied to the electrodes of the ETD device. Reagent ions are preferably retained within the ETD device by applying a negative potential at one or both ends of the ion guide.

The one or more DC travelling waves applied to the ETD device preferably comprise one or more transient DC voltages or potentials or one or more transient DC voltage or potential waveforms which preferably cause ions to be translated or urged along at least a portion of the axial length of the ETD device. Ions are therefore effectively translated along the length of the ETD device by one or more real or DC potential barriers which are preferably applied sequentially to electrodes along the length of the ETD device. As a result, positively charged analyte ions trapped between DC potential barriers are preferably translated along the length of the ETD device and are preferably driven or urged through and into close proximity with negatively charged reagent ions (or neutral reagent gas) which is preferably already present in or within the ETD device.

Optimum conditions for ion-ion reactions and/or ion-neutral gas reactions can be achieved within the ETD device by varying the speed, velocity or amplitude of the DC travelling wave. The kinetic energies of the reagent anions (or reagent gas) and the analyte cations can be closely matched. The residence time of ETD product or fragment ions resulting from the Electron Transfer Dissociation process can be carefully controlled so that the ETD fragment or product ions are not then duly neutralised. If positively charged ETD fragment or product ions resulting from the Electron Transfer Dissociation process are allowed to remain for too long in the ETD device after they have been formed, then they are likely to be neutralised.

A negative potential or potential barrier may optionally be applied at the front (e.g. upstream) end and also at the rear (e.g. downstream) end of the ETD device. The negative potential or potential barrier preferably acts to confine negatively charged reagent ions within the ETD device whilst at the same time allowing or causing positively charged product or fragment ions which are created within the ETD device to emerge and exit from the ETD device in a relatively fast manner. Other embodiments are also contemplated wherein analyte ions may interact with neutral gas molecules and undergo Electron Transfer Dissociation and/or Proton Transfer Reaction within the ETD device. If neutral reagent gas is provided within the ETD device then a potential barrier may or may not be provided at the ends of the ETD device.

A negative potential or potential barrier may be applied only to the front (e.g. upstream) end of the ETD device or alternatively a negative potential or potential barrier may be applied only to the rear (e.g. downstream) end of the ETD device. Other embodiments are contemplated wherein one or more negative potentials or potential barriers may be maintained at different positions along the length of the ETD device.

It is also contemplated that positive analyte ions may be retained within the ETD device by one or more positive potentials and then reagent ions or neutral reagent gas may be introduced into the ETD device.

Two electrostatic travelling waves or DC travelling waves may be applied to the electrodes of the ETD device in a substantially simultaneous manner. The travelling wave electrostatic fields or transient DC voltage waveforms may be arranged to move or translate ions substantially simultaneously in opposite directions towards, for example, a central region of the ETD device.

The ETD device and the PTR device according to the preferred embodiment preferably comprise a plurality of stacked ring electrodes which are preferably supplied with an AC or RF voltage. The electrodes preferably comprise an aperture through which ions are transmitted in use. Ions are preferably confined radially within the ETD device and within the preferred PTR device by applying opposite phases of the AC or RF voltage to adjacent electrodes so that a radial pseudo-potential barrier is preferably generated. The radial pseudo-potential barrier preferably causes ions to be confined radially along the central longitudinal axis of the ETD device and the preferred PTR device.

Two different analyte samples may be introduced from different ends of the ETD device. Additionally or alternatively, two different species of reagent ions may be introduced into the ETD device from different ends of the ETD device.

The DC travelling wave parameters (i.e. the parameters of the one or more transient DC voltages or potentials which are applied to the electrodes) can according to the preferred embodiment be optimised to provide control over the relative ion velocity between cations and anions (or analyte cations and neutral reagent gas) in the ETD device and the relative velocity between ETD product or fragment ions and neutral reagent gas molecules in the preferred PTR device. The relative ion velocity between cations and anions or cations and neutral reagent gas in the ETD device is an important parameter that preferably determines the reaction rate constant in Electron Transfer Dissociation experiments. Similarly, the relative velocity between product or fragment ions and neutral reagent gas in the preferred PTR device will also determine the degree to which the charge state of the product or fragment ions is reduced in the PTR device.

Other embodiments are also contemplated wherein the velocity of ion-neutral collisions in either the ETD device and/or the preferred PTR device' can be increased using either a high speed travelling wave or by using a standing or static DC wave. Such collisions can also be used to promote Collision Induced Dissociation ("CID"). In particular, the product or fragment ions resulting from Electron Transfer Dissociation or Proton Transfer Reaction may form non-covalent bonds. These non-covalent bonds can then be broken by Collision Induced Dissociation. Collision Induced Dissociation may be performed either sequentially in space to the process of Electron Transfer Dissociation in a separate Collision Induced Dissociation cell or in the preferred PTR device and/or sequentially in time to the Electron Transfer Dissociation process in the same ETD device.

ETD reagent ions and analyte ions may be generated by the same ion source or by two or more separate ion sources.

According to an embodiment Data Directed Analysis ("DDA") may be performed which incorporates real time monitoring of the ratio of the intensities of charge reduced cations or charge reduced analyte ions to the intensity of non-charged reduced parent cations within a product ion spectrum. The ratio may be used to control instrumental parameters that regulate the degree of Electron Transfer Dissociation within the ETD device and/or the degree of charge state reduction of product or fragment ions in the preferred PTR device. As a result, the fragment ion efficiency may be maximised or controlled in real time and on timescales which are comparable with liquid chromatography (LC) peak elution time scales.

Real time feedback control of instrumental parameters may be performed that maximizes or alters the abundance of fragment and/or charge reduced ions based upon the ratio of the abundance of charge reduced analyte cations to parent analyte cations.

Various embodiments of the present invention will now be described, by way of example only, and with reference to the accompanying drawings in which.

Figure 5:
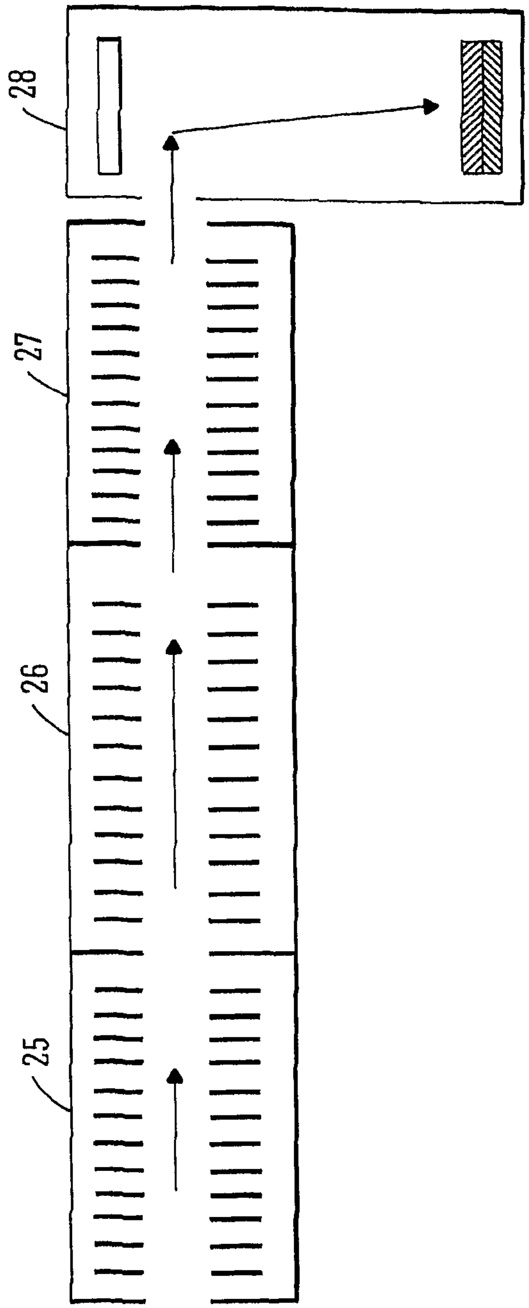
Figure 6:
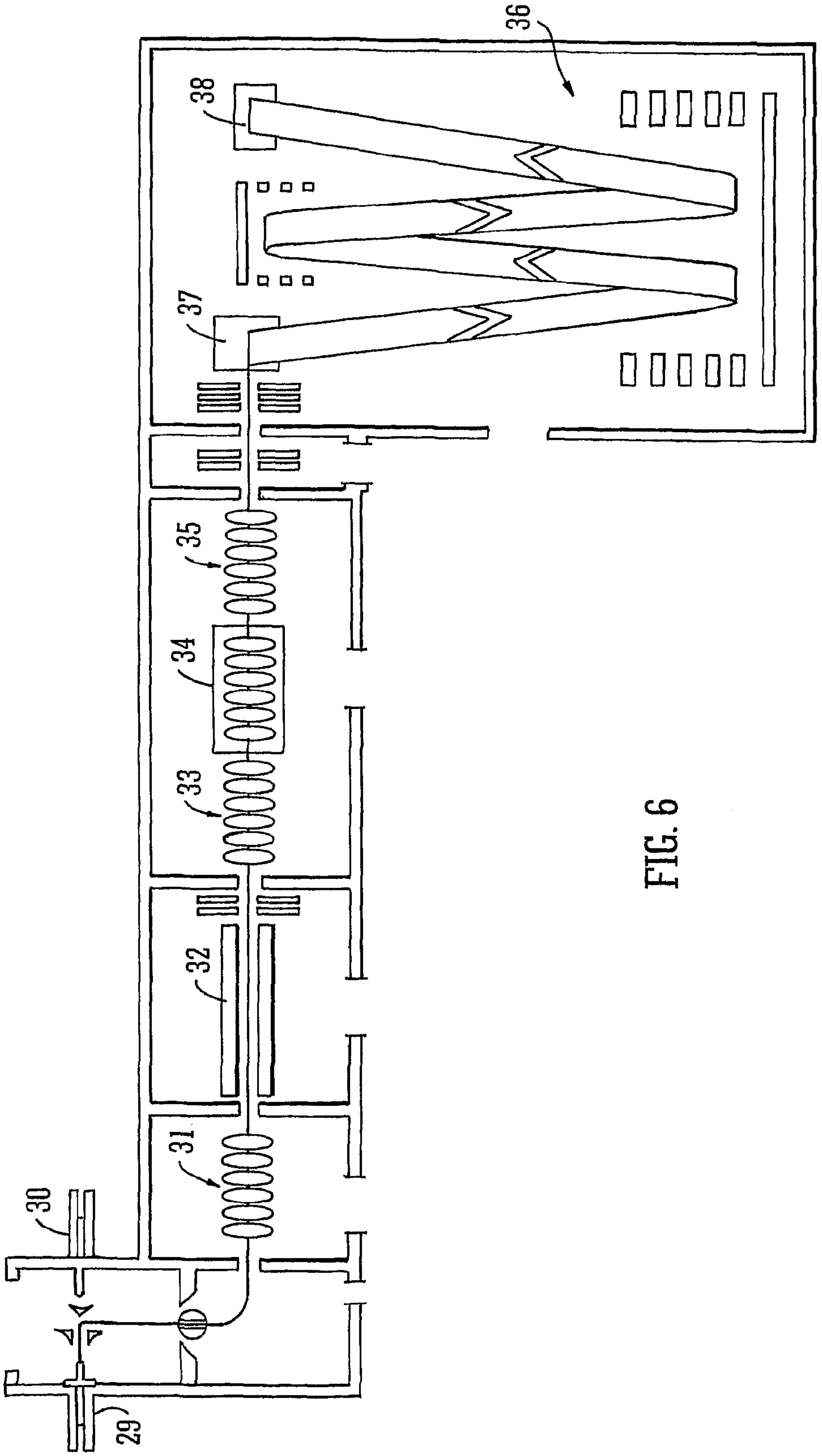
Figures 7A, 7B:
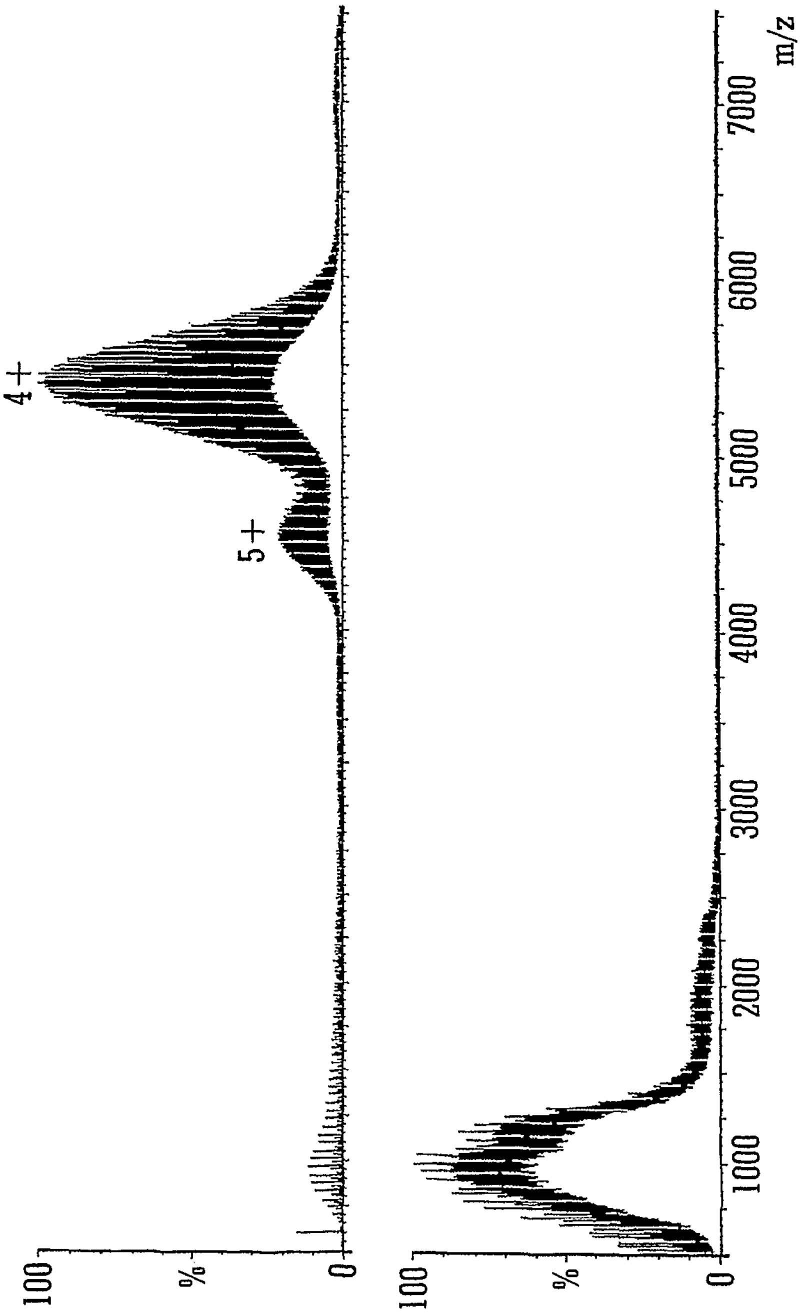

FIG. 5 shows a mass spectrometer according to an embodiment of the present invention wherein ETD reagent anions and analyte cations are arranged to react within an ETD collision cell and the resulting ETD product or fragment ions are then separated temporally in a ion mobility spectrometer before passing to a PTR cell comprising a neutral reagent gas according to a preferred embodiment of the present invention;

FIG. 6 shows a mass spectrometer according to an embodiment of the present invention wherein ions are fragmented by Electron Transfer Dissociation in a trap cell and wherein the resulting ETD product or fragment ions are transferred to a downstream PTR cell comprising a neutral reagent gas according to a preferred embodiment of the present invention; and FIG. 7A shows a mass spectrum obtained after reacting highly charged PEG 20K ions by Proton Transfer Reaction with a neutral superbase gas according to a preferred embodiment of the present invention in order to reduce the charge state of the ions and FIG. 7B shows a corresponding mass spectrum of PEG 20K ions which were not subjected to charge state reduction with a neutral superbase gas.

Although the present invention is primarily concerned with a PTR device comprising neutral reagent gas for reducing the charge state of ETD product or fragment ions, various aspects of an ETD device which is preferably arranged upstream of the preferred PTR device will first be described in order to explain how the ETD product or fragment ions are first generated.

Figure 1:
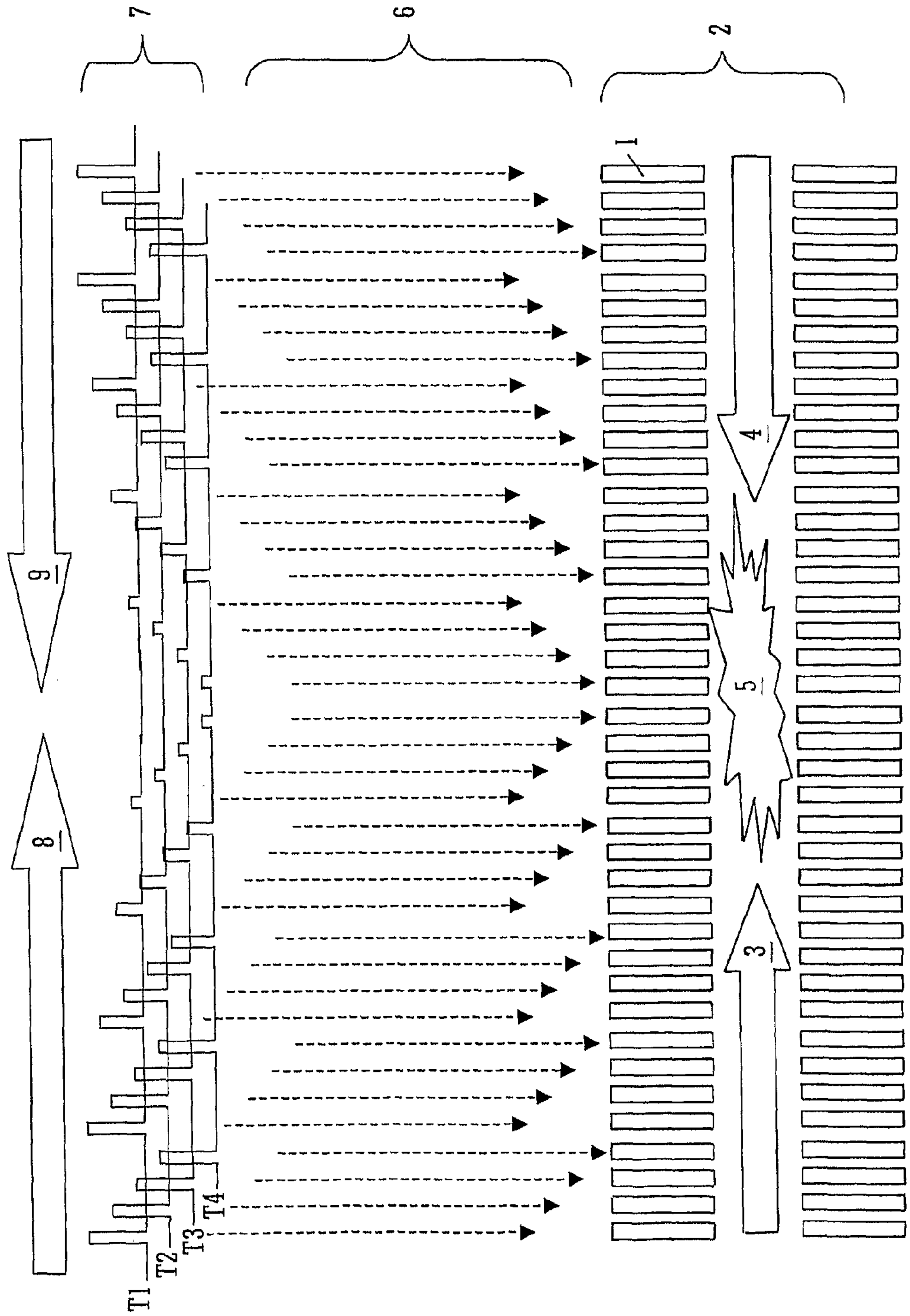
FIG. 1 shows two transient DC voltages or potentials being applied simultaneously to, the electrodes of an ETD device which is arranged upstream of a preferred PTR device so that analyte cations and reagent anions are brought together in the central region of the ETD device.

FIG. 1 shows a cross sectional view of the lens elements or ring electrodes 1 which together form a stacked ring ion guide Electron Transfer Dissociation ("ETD") device 2 which is preferably arranged upstream of a Proton Transfer Reaction ("PTR") device comprising a neutral reagent gas according to the preferred embodiment of the present invention.

Figure 3:
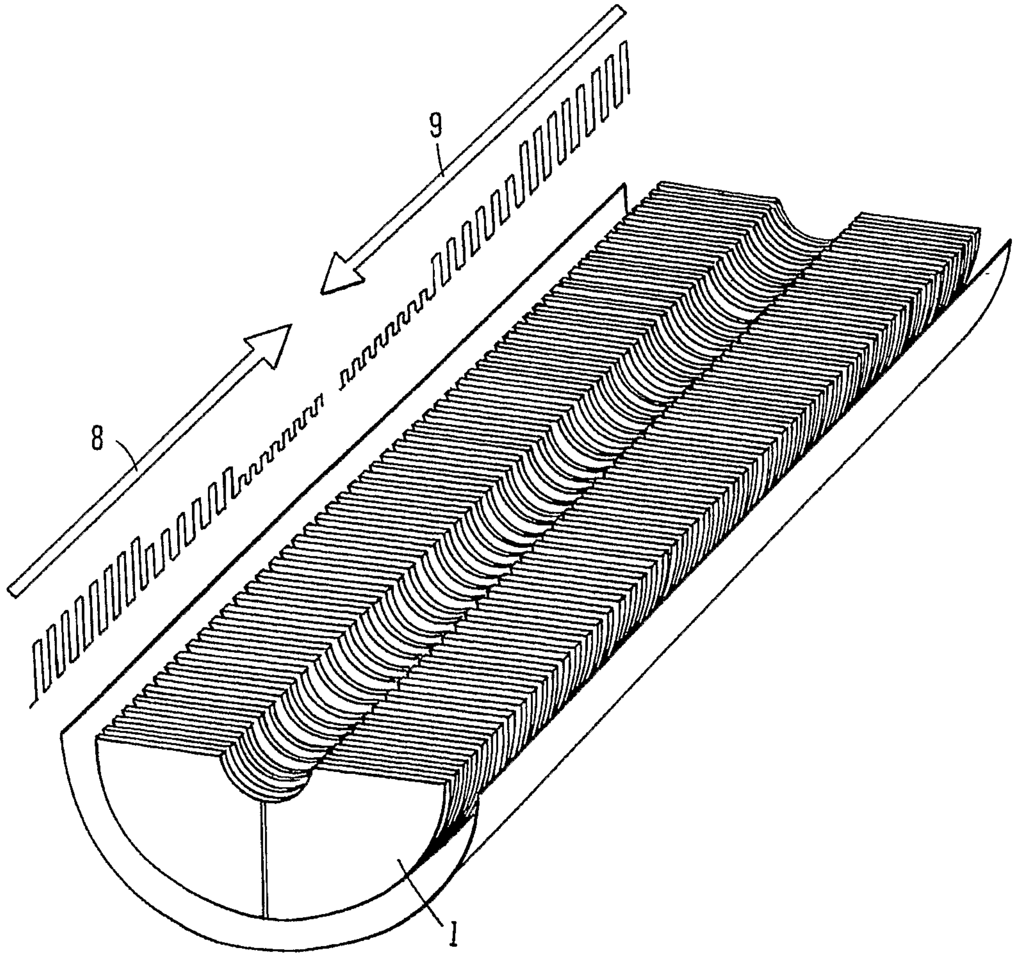
FIG. 3 shows a cross-sectional view of a SIMION® simulation of an ETD device arranged upstream of a preferred PTR device wherein two travelling DC voltage waveforms are applied simultaneously to the electrodes of the ETD device and wherein the amplitude of the travelling DC voltage waveforms progressively reduces towards the centre of the ETD device.

The ETD device 2 preferably comprises a plurality of electrodes 1 having one or more apertures through which ions are transmitted in use. A pattern or series of digital voltage pulses 7 is preferably applied to the electrodes 1 in use. The digital voltage pulses 7 are preferably applied in a stepped sequential manner and are preferably sequentially applied to the electrodes 1 as indicated by arrows 6. As is also illustrated in FIG. 3 which is described in more detail below, a first DC travelling wave 8 or series of transient DC voltages or potentials may be arranged to move in time from a first (upstream) end of the ETD device 2 towards the middle of the ETD device 2. At the same time, a second DC travelling wave 9 or series of transient DC voltages or potentials may optionally be arranged to move in time from a second (downstream) end of the ETD device 2 towards the middle of the ETD device 2. As a result, two DC travelling waves 8,9 or series of transient DC voltages or potentials may be arranged to converge from opposite sides of the ETD device 2 towards the middle or central region of the ETD device 2.

FIG. 1 shows digital voltage pulses 7 which are preferably applied to the electrodes 1 of the ETD device 2 as a function of time (e.g. as an electronics timing clock progresses). The progressive nature of the application of the digital voltage pulses 7 to the electrodes 1 of the ETD device 2 as a function of time is preferably indicated by arrows 6. At a first time T1, the voltage pulses indicated by T1 are preferably applied to the electrodes 1. At a subsequent time T2, the voltage pulses indicated by T2 are preferably applied to the electrodes 1. At a subsequent time T3, the voltage pulses indicated by T3 are preferably applied to the electrodes 1. Finally, at a subsequent time T4, the voltage pulses indicated by T4 are preferably applied to the electrodes 1. The voltage pulses 7 preferably have a square wave electrical potential profiles as shown.

The intensity or amplitude of the digital pulses 7 applied to the electrodes 1 of the ETD device 2 may be arranged to reduce towards the middle or centre of the ETD device 2. As a result, the intensity or amplitude of the digital voltage pulses 7 which are preferably applied to electrodes 1 which are close to the input or exit regions or ends of the ETD device 2 are preferably greater than the intensity or amplitude of the digital voltage pulses 7 which are preferably applied to electrodes 1 in the central region of the ETD device 2. Other embodiments are contemplated wherein the amplitude of the transient DC voltages or potentials or the digital voltage pulses 7 which are preferably applied to the electrodes 1 does not reduce with axial displacement along the length of the ETD device 2. According to this embodiment the amplitude of the digital voltages pulses 7 remains substantially constant with axial displacement along the length of the ETD device 2.

The voltage pulses 7 which are preferably applied to the lens elements or ring electrodes 1 of the ETD device 2 preferably comprise square waves. The electric potential within the ETD device 2 preferably relaxes so that the wave function potential within the ETD device 2 preferably takes on a smooth function.

Figure 2:
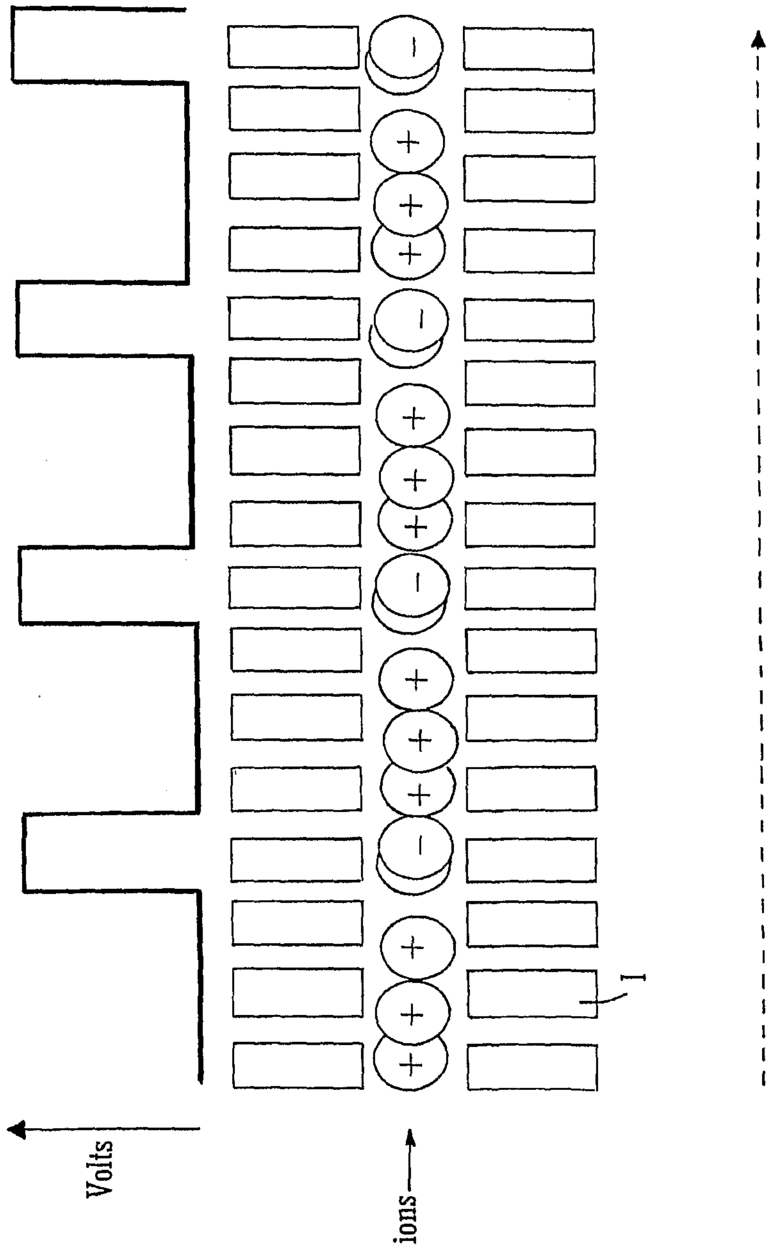
FIG. 2 illustrates how a travelling DC voltage waveform applied to the electrodes of an ETD device can be used to translate simultaneously both positive and negative ions in the same direction within the ETD device.

According to an embodiment analyte cations (e.g. positively charged analyte ions) and/or reagent anions (e.g. negatively charged reagent ions) may be simultaneously introduced into the ETD device 2 from opposite ends of the ETD device 2. Once in the ETD device 2, positive ions (cations) are repelled by the positive (crest) potentials of the DC travelling wave or the one or more transient DC voltages or potentials which are preferably applied to the electrodes 1 of the ETD device 2. As the electrostatic travelling wave moves along the length of the ETD device 2, the positive ions are preferably pushed along the ETD device 2 in the same direction as the travelling wave and in a manner substantially as shown in FIG. 2.

Negatively charged reagent ions (i.e. reagent anions) will be attracted towards the positive potentials of the travelling wave and will likewise be drawn, urged or attracted in the direction of the travelling wave as the travelling DC voltages or potentials move along the length of the ETD device 2. As a result, whilst positive ions will preferably travel in the negative crests (positive valleys) of the travelling DC wave as shown in FIG. 2, negative ions will preferably travel in the positive crests (negative valleys) of the travelling DC wave or the one or more transient DC voltages or potentials.

Two opposed travelling DC waves 8,9 may be arranged to translate ions substantially simultaneously towards the middle or centre of the ETD device 2 from both ends of the ETD device 2. The travelling DC waves 8,9 are preferably arranged to move towards each other and can be considered as effectively converging or coalescing in the central region of the ETD device 2. Cations and anions are preferably simultaneously carried towards the middle of the ETD device 2. Less preferred embodiments are contemplated wherein analyte cations may be simultaneously introduced from different ends of the reaction device. According to this less preferred embodiment the analyte ions may be reacted with neutral reagent gas present within the reaction device or which is added subsequently to the reaction device. According to another embodiment two different species of reagent ions may be introduced (simultaneously or sequentially) into the ETD device 2 from different ends of the ETD device 2.

According to an embodiment analyte cations may be translated towards the centre of the ETD device 2 by a first travelling DC wave 8 and reagent anions may be translated towards the centre of the ETD device 2 by a second different travelling DC wave 9.

Other embodiments are contemplated wherein both analyte cations and reagent anions may be simultaneously translated by a first DC travelling wave 8 towards the centre (or other region) of the ETD device 2. According to this embodiment other analyte cations and/or reagent anions may optionally be translated simultaneously towards the centre (or other region) of the ETD device 2 by an optional second DC travelling voltage wave 9. So for example, according to an embodiment reagent anions and analyte cations may be simultaneously translated by a first DC travelling wave 8 in a first direction at the same time as other reagent anions and analyte cations are simultaneously translated by a second DC travelling wave 9 which preferably moves in a second direction which is preferably opposed to the first direction.

As ions approach the middle or central region of the ETD device 2, the propelling force of the travelling waves 8,9 may be programmed to diminish and the amplitude of the travelling waves in the central region of the ETD device 2 may be arranged to become effectively zero or is otherwise at least significantly reduced. As a result, the valleys and peaks of the travelling waves preferably effectively disappear (or are otherwise significantly reduced) in the middle (centre) of the ETD reaction device 2 so that ions of opposite polarity (or less preferably of the same polarity) are then preferably allowed or caused to merge and interact with each other within the central region of the ETD device 2. If any ions stray randomly axially away from the middle or central region of the ETD device 2 due to, for example, multiple collisions with buffer gas molecules or due to high space charge effects, then these ions will then preferably encounter subsequent travelling DC waves which will preferably have the effect of translating or urging the ions back towards the centre of the ETD device 2.

Positive analyte ions may be translated towards the centre of the ETD device 2 by a first DC travelling wave 8 which is arranged to move in a first direction and negative reagent ions may be arranged to be translated towards the centre of the ETD device 2 by a second DC travelling wave 9 which is arranged to move in a second direction which may be opposed to the first direction.

According to a particularly preferred embodiment instead of applying two opposed DC travelling waves 8,9 to the electrodes 1 of the ETD device 2, a single DC travelling wave may instead be applied to the electrodes 1 of the ETD device 2 at any particular instance in time. According to this embodiment negatively charged reagent ions (or less preferably positively charged analyte ions) may first be loaded or directed into the ETD device 2. The reagent anions are preferably translated from an entrance region of the ETD device 2 along and through the ETD device by a DC travelling wave. The reagent anions are preferably retained within the ETD device 2 by applying a negative potential at the opposite end or exit end of the ETD device 2. After reagent anions (or less preferably analyte cations) have been loaded into the ETD device 2, positively charged analyte ions (or less preferably negatively charged reagent ions) are then preferably translated along and through the ETD device 2 by a DC travelling wave or a plurality of transient DC voltages or potentials applied to the electrodes 1.

The DC travelling wave which translates reagent anions and analyte cations preferably comprises one or more transient DC voltage or potentials or one or more transient DC voltage or potential waveforms which are preferably applied to the electrodes 1 of the ETD device 2. The parameters of the DC travelling wave and in particular the speed or velocity at which the transient DC voltages or potentials are applied to the electrodes 1 along the length of the ETD device 2 may be varied or controlled in order to optimise, maximise or minimise ion-ion reactions between negatively charged reagent ions and the positively charged analyte ions. As a result, the ETD process within the ETD device 2 can be carefully controlled.

Fragment or product ions which result from ion-ion interactions between analyte cations and reagent anions within the ETD device 2 are preferably swept out of the ETD device 2, preferably by a DC travelling wave and preferably before the resulting ETD fragment or product ions can be neutralised. Unreacted analyte ions and/or unreacted reagent ions may also be removed from the ETD device 2, preferably by a DC travelling wave, if so desired.

According to an embodiment a negative potential may optionally be applied to one or both ends of the ETD device 2 in order to retain negatively charged ions within the ETD device 2. The negative potential which is applied preferably also has the effect of encouraging or urging positively charged ETD fragment or product ions which are created or formed within the ETD device 2 to exit the ETD device 2 via one or both ends of the ETD device 2.

According to an embodiment positively charged ETD fragment or product ions may be arranged to exit the ETD device 2 within approximately 30 ms of being formed thereby avoiding neutralisation of the positively charged ETD fragment or product ions within the ETD device 2. However, other embodiments are contemplated wherein the ETD fragment or product ions formed within the ETD device 2 may be arranged to exit the ETD device 2 more quickly e.g. within a timescale of 0-10 ms, 10-20 ms or 20-30 ms. Alternatively, the fragment or product ions formed within the ETD device 2 may be arranged to exit the ETD device 2 more slowly e.g. within a timescale of 30-40 ms, 40-50 ms, 50-60 ms, 60-70 ms, 70-80 ms, 80-90 ms, 90-100 ms or >100 ms.

Ion motion within and through an ETD device 2 has been modelled using SIMION 8®. FIG. 3 shows a cross sectional view through a series of ring electrodes 1 forming an ETD device 2. Ion motion through an ETD device 2 arranged substantially as shown in FIG. 3 was modelled using SIMION 8®. FIG. 3 also shows two converging DC travelling wave voltages 8,9 or series of transient DC voltages 8,9 which were modelled as being progressively applied to the electrodes 1 forming the ETD device 2. The DC travelling wave voltages 8,9 were modelled as converging towards the centre of the ETD device 2 and had the effect of simultaneously translating ions from both ends of the ETD device 2 towards the centre of the ETD device 2.

According to an embodiment the ETD device 2 may comprise a plurality of stacked conductive circular ring electrodes 1 made from stainless steel. The ring electrodes may, for example, have a pitch of 1.5 mm, a thickness of 0.5 mm and a central aperture diameter of 5 mm. A travelling wave profile may be arranged to advance at 5 μs intervals so that the equivalent wave velocity towards the middle or centre of the ETD device 2 may be 300 m/s. Argon buffer gas may be provided within the ETD device 2 at a pressure of 0.1 mbar. The ETD device 2 may be 90 mm long. The typical amplitude of the voltage pulses applied may be 10V. Opposing phases of a 100V RF voltage may be applied to adjacent electrodes 1 forming the ETD device 2 so that ions are confined radially within the ETD device 2 within a radial pseudo-potential valley.

As soon as any ion-ion reactions (or less preferably ion-neutral gas reactions) have occurred within the ETD device 2, any resulting ETD product or fragment ions are preferably arranged to be swept out or otherwise translated away from the reaction volume of the ETD device 2 preferably relatively quickly. According to a preferred embodiment the resulting ETD product or fragment ions are preferably caused to exit the ETD device 2 and are then onwardly transmitted to a PTR device according to the preferred embodiment. The charge state of the ETD fragment or product ions is preferably reduced within the preferred PTR device by interacting with a neutral superbase gas. The reduced charge state ETD fragment or product ions are then preferably onwardly transmitted from the preferred PTR device to a mass analyser such as a Time of Flight mass analyser or an ion detector for subsequent mass analysis and/or detection.

Product or fragment ions formed within the ETD device 2 may be extracted from the ETD device 2 in various ways. In relation to embodiments wherein two opposed DC travelling voltage waves 8,9 are applied to the electrodes 1 of the ETD device 2, the direction of travel of the DC travelling wave 9 applied to the downstream region or exit region of the ETD device 2 may be reversed. The DC travelling wave amplitude may also be normalised along the length of the ETD device 2 so that the ETD device 2 is then effectively operated as a conventional travelling wave ion guide i.e. a single constant amplitude DC travelling voltage wave is provided which moves in a single direction along substantially the whole length of the ETD device 2.

Similarly, in relation to embodiments wherein a single DC travelling voltage wave initially loads reagent anions into the ETD device 2 and then analyte cations are then subsequently loaded into or transmitted through the ETD device 2 by the same DC travelling voltage wave, then the single DC travelling voltage wave will also act to extract positively charged ETD fragment or product ions which are created within the ETD device 2. The DC travelling voltage wave amplitude may be normalised along the length of the ETD device 2 once ETD fragment or product ions have been created within the ETD device 2 so that the ETD device 2 is then effectively operated as a conventional travelling wave ion guide.

It has been shown that if ions are translated by a travelling wave field through an ion guide which is maintained at a sufficiently high pressure (e.g. >0.1 mbar) then the ions may emerge from the end of the travelling wave ion guide in order of their ion mobility. Ions having relatively high ion mobilities will preferably emerge from the ion guide prior to ions having relatively low ion mobilities. Therefore, further analytical benefits such as improved sensitivity and duty cycle can be provided by exploiting ion mobility separations of the product or fragment ions that are generated in the central region of the ETD device 2.

According to an embodiment an ion mobility spectrometer or separation stage may be provided upstream and/or downstream of the ETD device 2. For example, according to an embodiment ETD product or fragment ions which have been formed within the ETD device 2 and which have been subsequently extracted from the ETD device 2 may then be separated according to their ion mobility (or less preferably according to their rate of change of ion mobility with electric field strength) in an ion mobility spectrometer or separator which is preferably arranged downstream of the ETD device 2 and upstream of a PTR device comprising a neutral reagent gas according to the preferred embodiment.

According to an embodiment the diameters of the internal apertures of the ring electrodes 1 forming the ETD device 2 may be arranged to increase progressively with electrode position along the length of the ETD device 2. The aperture diameters may be arranged, for example, to be smaller at the entry and exit sections of the ETD device 2 and to be relatively larger nearer the centre or middle of the ETD, device 2. This will have the effect of reducing the amplitude of the DC potential experienced by ions within the central region of the ETD device 2 whilst the amplitude of the DC voltages applied to the various electrodes 1 can be kept substantially constant. The travelling wave ion guide potential will therefore be at a minimum in the middle or central region of the ETD device 2.

According to another embodiment both the ring aperture diameter as well as the amplitude of the transient DC voltages or potentials applied to the electrodes 1 may be varied along the length of the ETD device 2.

In embodiments wherein the diameter of the aperture of the ring electrodes increases towards the centre of the ETD device 2, the RF field near the central axis will also decrease. Advantageously, this will give rise to less RF heating of ions in the central region of the ETD device 2. This effect can be particularly beneficial in optimising Electron Transfer Dissociation type reactions and minimising collision induced reactions.

The position of the focal point or reaction region within the ETD device 2 may be moved or varied axially along the length of the ETD device 2 as a function of time. This has the advantage in that ions can be arranged to be flowing or passing continuously through the ETD device 2 without stopping in a central reaction region. This allows a continuous process of introducing analyte ions and reagent ions at the entrance of the ETD device 2 and ejecting ETD product or fragment ions from the exit of the ETD device 2 to be achieved. Various parameters such as the speed of translation of the focal point may be varied or controlled in order to optimise, maximise or minimise the ETD ion-ion reaction efficiency. The motion of the focal point can be achieved or controlled electronically in a stepwise fashion by switching or controlling the voltages applied to the appropriate lenses or ring electrodes 1.

Product or fragment ions resulting from the Electron Transfer Dissociation reaction are preferably arranged to emerge from the exit of the ETD device 2 and are then transmitted to a PTR device comprising a neutral reagent gas according to the preferred embodiment wherein the product or fragment ions are reduced in charge state. The ions are then onwardly transmitted to, for example, a Time of Flight mass analyser. To enhance the overall sensitivity of the system, the timing of the release of ions from the ETD device 2 and/or from the preferred PTR device may be synchronised with the pusher electrode of an orthogonal acceleration Time of Flight mass analyser.

According to an embodiment analyte cations and reagent anions which are input into the ETD device 2 may be generated from separate or distinct ion sources. In order to efficiently introduce both cations and anions from separate ion sources into an ETD device 2 a further ion guide may be provided upstream (and/or downstream) of the ETD device 2. The further ion guide may be arranged to simultaneously and continuously receive and transfer ions of both polarities from separate ion sources at different locations and to direct both the analyte and reagent ions into the ETD device 2.

Experiments involving applying travelling DC voltage waves to the electrodes of a stacked ring RF ion guide have shown that increasing the amplitude of the travelling DC wave voltage pulses and/or increasing the speed of the travelling DC wave voltage pulses within an ion reaction volume can cause ion-ion reaction rates to be reduced or even stopped when necessary. This is due to the fact that the travelling DC voltage wave can cause a localised increase in the relative velocity of analyte cations relative to reagent anions. The ion-ion reaction rate has been shown to be inversely proportional to the cube of the relative velocity between cations and anions.

Increasing the amplitude and/or the speed of the travelling DC voltage wave may also cause cations and anions to spend less time together in the ETD device 2 and hence may have the effect of reducing the reaction efficiency.

Ion-ion reactions within the ETD device 2 may be controlled, optimised, maximised or minimised by varying the amplitude and/or the speed of one or more DC travelling waves applied to the electrodes 1 of the ETD device 2. Other embodiments are contemplated wherein instead of controlling the amplitude of the travelling DC wave fields electronically, the field amplitudes are controlled mechanically by utilising stack ring electrodes that vary in internal diameter or axial spacing. If the aperture of the ring stack or ring electrodes 1 is arranged to increase in diameter then the travelling wave amplitude experienced by ions will decrease assuming that the same amplitude voltage is applied to all electrodes 1.

The amplitude of the one or more travelling DC voltage waves may be increased further and then the travelling DC voltage wave velocity may be suddenly reduced to zero so that a standing wave is effectively created. Ions in the reaction volume may be repeatedly accelerated and then decelerated along the axis of the ETD device 2. This approach can be used to cause an increase in the internal energy of product or fragment ions which are created or formed within the ETD device 2 so that the product or fragment ions may further decompose by the process of Collision Induced Dissociation (CID). This method of Collision Induced Dissociation is particularly useful in separating non-covalently bound product or fragment ions which may result from Electron Transfer Dissociation. Precursor ions that have previously been subjected to Electron Transfer Dissociation reactions often partially decompose (especially singly and doubly charged precursor ions) and the partially decomposed ions may remain non-covalently attached to each other.

Non-covalently bound product or fragment ions of interest may be separated from each other as they are being swept out from the ETD device 2 by the travelling DC wave operating in its normal mode of transporting ions. This may be achieved by setting the velocity of the travelling wave to a sufficiently high value such that ion-molecule collisions occur which induce the non-covalently bound fragment or product ions to separate.

Figure 4:
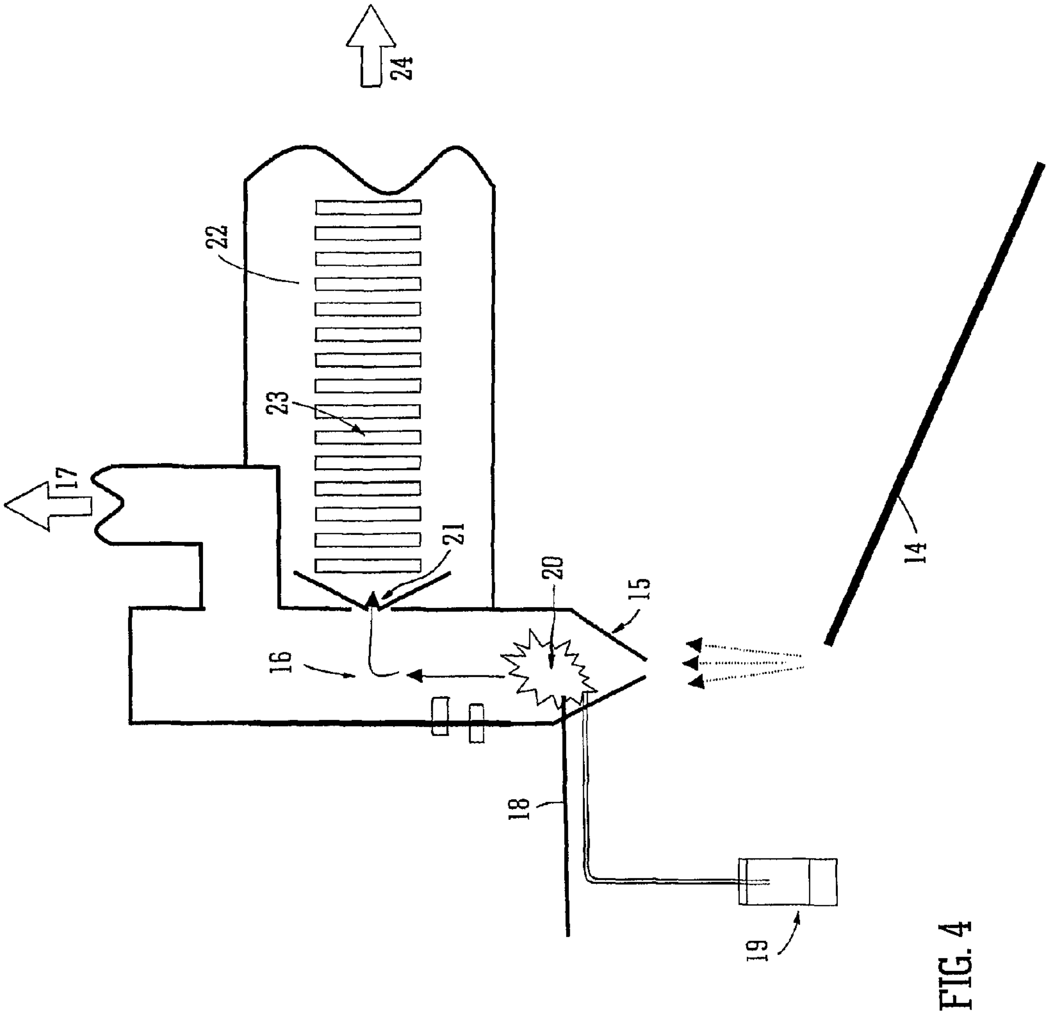
FIG. 4 shows an ion source and initial vacuum stages of a mass spectrometer according to an embodiment of the present invention wherein an Electrospray ion source is used to generate analyte ions and wherein ETD reagent ions are generated in a glow discharge region located in an input vacuum chamber of the mass spectrometer.

Analyte ions and reagent ions may be generated either by the same ion source or by a common ion generating section or ion source of a mass spectrometer. For example, analyte ions may be generated by an Electrospray ion source and ETD reagent ions may be generated in a glow discharge region which is preferably arranged downstream of the Electrospray ion source. FIG. 4 shows an embodiment wherein analyte ions are produced by an Electrospray ion source. The capillary 14 of the Electrospray ion source is preferably maintained at +3 kV. The analyte ions are preferably drawn towards a sample cone 15 of a mass spectrometer which is preferably maintained at 0V. Ions preferably pass through the sample cone 15 and into a vacuum chamber 16 which is preferably pumped by a vacuum pump 17. A glow discharge pin 18 connected to a high voltage source is preferably located close to and downstream of the sample cone 15 within the vacuum chamber 16. The glow discharge pin 18 may according to one embodiment be maintained at −750V. Reagent from a reagent source 19 is preferably bled or otherwise fed into the vacuum chamber 16 at a location close to the glow discharge pin 18. As a result, ETD reagent ions are preferably created within the vacuum chamber 16 in a glow discharge region 20. The ETD reagent ions are then preferably drawn through an extraction cone 21 and pass into a further downstream vacuum chamber 22. An ion guide 23 is preferably located in the further vacuum chamber 22. The ETD reagent ions are then preferably onwardly transmitted to further stages 24 of the mass spectrometer and are preferably subsequently transmitted to an ETD device where the ETD reagent ions are caused to interact with analyte ions causing the analyte ions to fragment by ETD.

A dual mode or dual ion source may be provided. For example, an Electrospray ion source may be used to generate analyte (or ETD reagent) ions and an Atmospheric Pressure Chemical Ionisation ion source may be used to generate ETD reagent (or analyte) ions. Negatively charged ETD reagent ions may be passed into an ETD device by means of one or more travelling DC voltages or transient DC voltages which are applied to the electrodes of the ETD device. A negative DC potential may be applied to the ETD device in order to retain the negatively charged reagent ions within the ETD device. Positively charged analyte ions may then be input into the ETD device by applying one or more travelling DC voltage or transient DC voltages to the electrodes of the ETD device. The positively charged analyte ions are preferably not retained or prevented from exiting the ETD device. The various parameters of the travelling DC voltage or transient DC voltages applied to the electrodes of the ETD device may be optimised or controlled in order to optimise, maximise or minimise the degree of fragmentation of analyte ions by Electron Transfer Dissociation.

If a Glow Discharge ion source is used to generate ETD reagent ions and/or analyte ions then the pin electrode 18 of the ion source may be maintained at a potential of ±500-700V. The potential of the Glow Discharge ion source may be switched relatively rapidly between a positive potential (in order to generate cations) and a negative potential (in order to generate anions).

If a dual mode or dual ion source is provided, then the ion source may be switched between modes (or the ion sources may be switched between each other) approximately every 50 ms. The ion source may be switched between modes (or the ion sources may be switched between each other) on a timescale of <1 ms, 1-10 ms, 10-20 ms, 20-30 ms, 30-40 ms, 40-50 ms, 50-60 ms, 60-70 ms, 70-80 ms, 80-90 ms, 90-100 ms, 100-200 ms, 200-300 ms, 300-400 ms, 400-500 ms, 500-600 ms, 600-700 ms, 700-800 ms, 800-900 ms, 900-1000 ms, 1-2 s, 2-3 s, 3-4 s, 4-5 s or >5 s. Alternatively, instead of switching one or more ions sources ON and OFF, the one or more ion sources may instead be left substantially ON and an ion source selector device such as a baffle or rotating ion beam block may be used. For example, two ion sources may be left ON but the ion beam selector may only allow ions from one of the ion sources to be transmitted to the mass spectrometer at any particular instance in time. Yet further embodiments are contemplated wherein an ion source may be left ON and another ion source may be switched repeatedly ON and OFF.

Another embodiment is contemplated wherein a dual mode ion source may be switched between modes or two ion sources may be switched ON/OFF in a symmetric or asymmetric manner. For example, according to an embodiment an ion source producing parent or analyte ions may be left ON for approximately 90% of a duty cycle. For the remaining 10% of the duty cycle the ion source producing analyte ions may be switched OFF and ETD reagent ions may be produced in order to replenish the reagent ions within the ETD device. Other embodiments are contemplated wherein the ratio of the period of time during which the ion source generating analyte ions is switched ON (or analyte ions are transmitted into the mass spectrometer) relative to the period of time during which the ion source generating ETD reagent ions is switched ON (or ETD reagent ions are transmitted into the mass spectrometer or generated within the mass spectrometer) may fall within the range <1, 1-2, 2-3, 3-4, 4-5, 5-6, 6-7, 7-8, 8-9, 9-10, 10-15, 15-20, 20-25, 25-30, 30-35, 35-40, 40-45, 45-50 or >50.

According to an embodiment Electron Transfer Dissociation fragmentation may be controlled, maximised, minimised, enhanced or substantially prevented by controlling the velocity and/or amplitude of the travelling DC voltages applied to the electrodes of an ETD device. If the travelling DC voltages are applied to the electrodes in a very rapid manner then very few analyte ions may fragment by means of Electron Transfer Dissociation.

Other less preferred embodiments are contemplated wherein gas flow dynamic effects and/or pressure differential effects may be used in order to urge or force analyte ions and/or reagent ions through portions of an ETD device. Gas flow dynamic effects may be used in addition to other ways or means of driving or urging ions along and through an ETD device.

According to a less preferred embodiment the charge state of parent or analyte ions may first be reduced by Proton Transfer Reaction (either by analyte ion-reagent ion interactions or by analyte ion-neutral superbase reagent gas interactions) prior to the parent or analyte ions interacting with ETD reagent ions and/or neutral reagent gas in the ETD device 2.

According to a less preferred embodiment parent or analyte ions may be fragmented or otherwise caused to dissociate by transferring protons to ETD reagent ions or neutral reagent gas.

Product or fragment ions which result from Electron Transfer Dissociation may non-covalently bond together. Embodiments are contemplated wherein non-covalently bonded product or fragment ions may be fragmented by Collision Induced Dissociation, Surface Induced Dissociation or other fragmentation processes either in an ETD device in which Electron Transfer Dissociation was performed or in a separate reaction device or cell which is preferably arranged downstream of the ETD device.

Less preferred embodiments are contemplated wherein parent or analyte ions may be caused to fragment or dissociate following reactions or interactions with metastable atoms or ions such as atoms or ions of xenon, caesium, helium or nitrogen.

According to an embodiment neutral helium gas may be provided to the ETD device at a pressure in the range 0.01-0.1 mbar, less preferably 0.001-1 mbar. Helium gas has been found to be particularly useful in supporting Electron Transfer Dissociation. Nitrogen and argon gas are less preferred and may cause at least some parent or analyte ions to fragment by Collision Induced Dissociation rather than by Electron Transfer Dissociation.

A particularly preferred embodiment of the present invention is shown in FIG. 5 and comprises an ETD reaction cell 25, an ion mobility device or ion mobility spectrometer or separator 26 arranged downstream of the ETD reaction cell 25, and a preferred PTR cell 27 comprising a neutral reagent gas which is arranged downstream of the ion mobility device or ion mobility spectrometer or separator 26.

The ETD reaction cell 25 preferably comprises an Electron Transfer Dissociation device 25. ETD reagent anions and analyte cations are preferably arranged to react within the Electron Transfer Dissociation device 25. A plurality of ETD product or fragment ions differing in mass, charge state and ion mobility are preferably produced as a result of the Electron Transfer Dissociation process and these ETD product or fragment ions preferably emerge from the ETD reaction cell 25.

The ETD product or fragment ions which preferably emerge from the ETD reaction cell 25 are preferably passed through the ion mobility spectrometer or separator 26. In a mode of operation the ETD product of fragment ions are preferably separated temporally according to their ion mobility as they are transmitted through the ion mobility spectrometer or separator 26. The ion mobility spectrometer or separator 26 preferably provides valuable information regarding the shape, conformation and charge state of the ETD product or fragment ions and preferably also reduces the spectral complexity of data measured by a Time of Flight mass analyser 28 which is preferably arranged downstream of the preferred PTR cell 27. In alternative modes of operation the ion mobility spectrometer or separator 26 may effectively be switched OFF so that the ion mobility spectrometer or separator 26 operates as an ion guide wherein ions are transmitted through the ion mobility spectrometer or separator 26 without being fragmented and without substantially being temporally separated according to their ion mobility.

In a mode of operation the preferred PTR cell 27 may be operated as a Collision Induced Dissociation ("CID") fragmentation cell by maintaining a relatively high potential difference between the exit of the ion mobility spectrometer or separator 26 and the entrance to the PTR cell 27. As a result, ions may be energetically accelerated into the PTR cell 27 with the result that the ions are caused to fragment by CID within the PTR cell 27. It is known that the product or fragment ions resulting from Electron Transfer Dissociation may form non-covalent bonds so that two or more product or fragment ions may cluster together. The preferred PTR cell 27 may therefore be used to subject the product or fragment ions which have been formed in the ETD reaction cell 25 to CID fragmentation so that any non-covalent bonds between product or fragment ions are effectively broken. This process can be considered as a form of secondary activation by CID in order to generate c-type and z-type ETD fragment ions. The Time of Flight mass analyser 28 arranged downstream of the PTR cell 27 is preferably arranged to mass analyse fragment or product ions which emerge from the PTR cell 27. According to a particularly advantageous aspect of the preferred embodiment the fragment or product ions are reduced in charge state by interacting with a neutral reagent gas within the PTR cell 27. As a result, the Time of Flight mass analyser 28 is able to resolve the reduced charge state product or fragment ions.

Other embodiments are contemplated wherein electron transfer and/or proton transfer may be performed in both collision cells 25,27 (and/or in the ion mobility spectrometer or separator 26). According to a less preferred embodiment, CD may be performed in the ETD (or upstream) reaction cell 25 and ETD and/or PTR may be preferred in the PTR (or downstream) reaction cell 27. These variations may be useful for studying any conformation changes of ions following fragmentation by CID.

According to the preferred embodiment of the present invention ETD product or fragment ions which are formed as a result of ETD within the ETD cell 25 are reacted by Proton Transfer Reaction with uncharged neutral vapour of a superbase, such as Octahydropyrimidolazepine (DBU) within the PTR device or transfer cell 27. The charge state of the ETD product or fragment ions is preferably reduced and the ETD product or fragment ions are then preferably onwardly transmitted to a Time of Flight mass analyser for subsequent mass to charge ratio analysis.

FIG. 6 shows a mass spectrometer according to an embodiment of the present invention comprising an analyte spray 29 and lockmass reference spray 30. The mass spectrometer further comprises a first vacuum chamber, a second vacuum chamber housing an ion guide 31, a third vacuum chamber housing a quadrupole mass filter 32, a fourth vacuum chamber housing an ETD device 33, an ion mobility spectrometer or separator 34 and a PTR device 35 comprising a neutral reagent gas. A Time of Flight mass analyser 36 is housed in a further vacuum chamber downstream of the fourth vacuum chamber. The ETD reaction device or trap cell 33 is provided upstream of the ion mobility spectrometer or separator 34 and the preferred PTR device or transfer cell 35 is provided downstream of the ion mobility spectrometer or separator 34.

According to an embodiment singly charged Electron Transfer Dissociation reagent anions such as radical Azobenzene (or Fluoranthene) ions may be selected by the quadrupole mass filter 32 and may be stored within the ETD reaction device or trap cell 33. Multiply charged analyte precursor cations may then be selected by the quadrupole mass filter 32 and are preferably transmitted into the ETD reaction device or trap cell 33. The multiply charged precursor or analyte cations are then preferably arranged to fragment by Electron Transfer Dissociation within the ETD reaction device or trap cell 33. The resulting product or fragment ions are then preferably transferred via the ion mobility spectrometer or separator 34 to the preferred PTR device or transfer cell 35.

According to an embodiment a superbase reagent (liquid) may be provided in a glass tube (6.35 mm O.D.×2.81 mm I.D.×152.4 mm long) which is connected to a needle valve through a union connector. The needle valve may be connected via a stainless steel tubing and one or more switching valves to the transfer gas inlet bulkhead which preferably communicates with the transfer cell or PTR device 35 as shown in FIG. 6. The glass tube and vapour flow path are preferably heated to 100-150° C. using, for example, heating tape to ensure rapid evaporation of the superbase reagent (e.g. DBU) and to keep the superbase vapour from condensing back to liquid.

According to a less preferred embodiment, Electron Transfer Dissociation and Proton Transfer Reaction charge state reduction may be performed sequentially in time in the same reaction cell.

According to another less preferred embodiment Electron Transfer Dissociation and Proton Transfer Reaction charge state reduction may be performed substantially simultaneously in the same reaction cell rather than sequentially in space (e.g. in separate reaction cells).

Other less preferred embodiments are contemplated wherein Proton Transfer Reaction charge state reduction of parent or analyte ions may be effected prior to Electron Transfer Dissociation or other fragmentation processes. According to this embodiment highly charged positive analyte or precursor ions may first be arranged to lose some of their charge due to reaction by Proton Transfer Reaction with, for example, a neutral superbase reagent gas in a reaction cell. Trap cell 33 as shown in FIG. 6 may, for example, be used for this purpose. The resulting reduced charge state analyte ions are then preferably arranged to pass through ion mobility spectrometer or separator 34 and are then preferably trapped in transfer cell 35. Singly charged negative ETD reagent ions selected by a quadrupole mass filter 32 may then be transmitted through the trap cell 33 and the ion mobility spectrometer or separator 34. The singly charged negative ETD reagent ions may then be arranged to fragment the reduced charge state analyte ions which are present in the transfer cell 35 by the process of Electron Transfer Dissociation. According to this embodiment the ion mobility spectrometer or separator may either be switched ON (so as to separate ions according to their ion mobility) or alternatively may be switched OFF (so as to function just as an ion guide without separating ions according to their ion mobility). Further embodiments are contemplated wherein singly charged negative ETD reagent ions may pass directly into the transfer cell 35 without passing through the trap cell 33.

According to another embodiment singly charged negative ETD reagent ions may be transmitted through the trap cell 33 but neutral superbase reagent gas may be removed or decreased in concentration when the negative ETD reagent ions are transmitted through the trap cell 33.

Precursor ions are preferably selected by a quadrupole mass filter 32 prior to ETD reaction.

Other embodiments are contemplated wherein the first stage of reaction may comprise other fragmentation methods such as Collision Induced Dissociation (CID), Electron Capture Dissociation (ECD) or Surface Induce Dissociation (SID). According to an embodiment, fragment or product ions may be generated in a trap cell (e.g. trap cell 33 as shown in FIG. 6) by CID, ECD or SID. The resulting fragment or product ions may then be transmitted to a transfer cell (e.g. transfer cell 35 as shown in FIG. 6). The charge state of the fragment or product ions may then preferably be reduced by reacting the fragment or product ions with a neutral superbase reagent gas by means of Proton Transfer Reactions within the transfer cell 35.

According to another embodiment neutral reagent gas may be used to produce the primary Electron Transfer Dissociation reaction and hence according to this embodiment an anion source for producing reagent ions is advantageously not required. A neutral reagent gas such as an alkali metal vapour and in particular reagent vapor comprising Caesium (Cs) may be used in order to perform ETD of analyte ions. According to this embodiment reagent molecules become associated with odd electron radical species with very loosely or weakly bound electrons. According to this embodiment the ETD fragmentation of analyte ions by interacting with caesium vapour may be performed using a high energy instrument such as a sector instrument. The analyte ions which are fragmented may have a relatively high charge state.

FIGS. 7A and 7B illustrate various beneficial aspects of reducing the charge state of ETD product or fragment ions in a PTR device in accordance with the (preferred embodiment of the present invention. In order to illustrate aspects of the preferred embodiment highly charged Polyethylene glycol ions (PEG 20K) were allowed to react with a superbase reagent called 2,3,4,6,7,8,9,10-Octahydropyrimidol[1,2-a] azepine (commonly known as "DBU") within a PTR or reaction cell of a mass spectrometer. FIG. 7A shows a resulting mass spectrum of the PEG 20K ions after Proton Transfer Reaction and shows that the ions have been reduced in charge state to have predominantly a 4+ charge state. By way of contrast, FIG. 7B shows a corresponding mass spectrum wherein the PEG 20K ions were not subjected to charge state reduction with DBU. It is apparent from FIG. 7B that the non-charge reduced parent ions comprise a complex mixture of ions having high charge states and hence low mass to charge values. Individual oligomers are not discernible in the mass spectrum and the spectrum comprises relatively broad noisy bands due to the overlapping of charge states and the compression of the mass to charge ratio range due to the high charge states. A PEG sample consists of a mixture of oligomers each of which can have a variety of charge states. It is believed that up to 28 charges can be placed onto an oligomer chain with a mass of 20K Da. Under the resolving power of a Time of Flight mass analyser such complexity results in spectral congestion and hence it is not possible to extract molecular weight information from the data.

In contrast, peaks in the mass spectrum shown in FIG. 7A of the charge reduced ions can be resolved by a Time of Flight mass analyser thereby providing information about the charge state and mass of the ions whereas the mass spectrum shown in FIG. 7B relating to the non-charge reduced ions is unresolved and provides relatively little analytical information. It is apparent, therefore, that reducing the charge state of ETD product or fragment ions in a PTR device by interacting the ETD product or fragment ions with a neutral reagent gas such as DBU is particularly advantageous.

According to the preferred embodiment the neutral superbase gas which is provided in the preferred PTR device preferably strips away protons from highly charged ETD product or fragment ions. The neutral superbase reagent gas therefore preferably acts as a proton sponge.

According to an embodiment the neutral superbase reagent gas which is provided in the preferred PTR device may comprise 1,1,3,3-Tetramethylguanidine ("TMG"), 2,3,4,6,7,8,9,10-Octahydropyrimidol[1,2-a]azepine {Synonym: 1,8-Diazabicyclo[5.4.0]undec-7-ene ("DBU")} or 7-Methyl-1,5,7-triazabicyclo[4.4.0]dec-5-ene ("MTBD"){Synonym: 1,3,4,6,7,8-Hexahydro-1-methyl-2H-pyrimido[1,2-a]pyrimidine}.

Although the preferred embodiment relates to performing PTR in an ion guide or device comprising a plurality of electrodes having apertures through which ions are transmitted, other embodiments are contemplated wherein the ETD device and/or the preferred PTR device may instead comprise a plurality of rod electrodes. A DC voltage gradient may be applied along at least a portion of the axial length of the rod set. If a control system determines that the degree of ETD fragmentation in the ETD device and/or the degree of PTR charge reduction in the PTR device is too high, then the DC voltage gradient may be increased so that the ion-ion reaction times between analyte ions and ETD reagent ions in the ETD device is reduced and/or the ion-neutral gas reaction times of ETD product or fragment ions and neutral superbase reagent gas in the PTR device is reduced. Similarly, if the control system determines that the degree of ETD fragmentation and/or PTR charge reduction is too low, then the DC voltage gradient may be decreased so that the ion-ion reaction times between analyte ions and reagent ions in the ETD device is increased and/or the ion-neutral gas reaction times of ETD product or fragment ions and neutral superbase reagent gas in the PTR device is increased.

According to a less preferred embodiment a neutral reagent gas (e.g. caesium vapour) may be used instead of reagent ions in an ETD device in order to perform ETD.

According to an embodiment a control system may vary the degree of radial RF confinement within a radial pseudo-potential well. If the RF voltage applied, for example, to the electrodes of the ETD device and/or the preferred PTR device is increased, then the resulting pseudo-potential well will have a narrower profile leading to a reduced ion-ion or ion-neutral gas reaction volume. As a result, there will, for example, be greater interaction between analyte ions and reagent ions in the ETD device leading to increased ETD effects. If the control system determines that the degree of ETD fragmentation in the ETD device is too high, then the control system may reduce the RF voltage so that there is less mixing between analyte ions and reagent ions in the ETD device. Similarly, if the control system determines that the degree of ETD fragmentation is too low, then the control system may increase the RF voltage so that there is increased mixing between analyte ions and reagent ions in the ETD device.

Negative reagent ions may be trapped within the ETD device or ion guide by applying a negative potential at one or both ends of the ETD device or ion guide. If the potential barrier is too low, then the ETD device may be considered to be relatively leaky in terms of ETD reagent ions. However, the negative potential barrier will also have the effect of accelerating positive analyte ions along and through the ETD device. Therefore, overall if the negative potential barrier(s) is set relatively low then the ion-ion reaction time in the ETD device is preferably increased and there is an increased reaction cross-section leading to increased ETD fragmentation. If the control system determines that the degree of ETD fragmentation is too high, then the potential barrier may be increased so that there is less mixing between analyte ions and ETD reagent ions. Similarly, if the control system determines that the degree of ETD fragmentation is too low, then the potential barrier may be decreased so that there is increased mixing between analyte ions and ETD reagent ions.

Embodiments of the present invention are contemplated wherein a mass spectrometer may perform multiple different analyses of ions which may, for example, being eluting from a Liquid Chromatography column. According to an embodiment, within the timescale of an LC elution peak, the analyte ions may, for example, be subjected to a parent ion scan in order to determine the mass to charge ratio(s) of the parent or precursor ions. Parent or precursor ions may then be mass selected by a quadrupole or other mass filter and subjected, for example, to CID fragmentation in order to produce and then mass analyse b-type and y-type fragment ions. The parent or precursor ions may then subsequently be mass selected by a quadrupole or other mass filter and may then be subjected to ETD fragmentation in order to produce and then mass analyse c-type and z-type fragment ions. The ETD fragment ions are preferably reduced in charge state within a preferred PTR device by interacting with a neutral reagent gas prior to being onwardly transmitted to the mass analyser. In a further mode of operation parent or precursor ions may be subjected to high/low switching of a collision cell. According to this embodiment the parent or precursor ions are repeatedly switched between two different modes of operation. In the first mode of operation the parent or precursor ions may be subjected to CID or ETD fragmentation. In the second mode of operation the parent or precursor ions are preferably not substantially subjected to either CID or ETD fragmentation.

The ions which are fragmented and/or reduced in charge may according to an embodiment comprise peptide ions derived from peptides which have been subject to hydrogen-deuterium ("H-D") exchange. Hydrogen-deuterium exchange is a chemical reaction wherein a covalently bonded hydrogen atom is replaced with a deuterium atom. In view of the fact that a deuterium nucleus is heavier than hydrogen due to the addition of an extra neutron, then a protein or peptide comprising some deuterium will be heavier than one that contains all hydrogen. As a result, as a protein or peptide is increasingly deuterated then the molecular mass will steadily increase and this increase in molecular mass can be detected by mass spectrometry. It is therefore contemplated that the preferred method may be used in the analysis of proteins or peptides incorporating deuterium. The incorporation of deuterium may be used to study both the structural dynamics of proteins in solution (e.g. by hydrogen-exchange mass spectrometry) as well as the gas phase structure and fragmentation mechanisms of polypeptide ions. A particularly advantageous effect of Electron Transfer Dissociation of peptides is that ETD fragmentation (unlike CD fragmentation) does not suffer from the problem of hydrogen scrambling which is the intramolecular migration of hydrogens upon vibrational excitation of the even-electron precursor ion. According to an embodiment of the present invention the preferred apparatus and method may be used to effect ETD fragmentation and/or subsequent PTR charge reduction of peptide ions comprising deuterium. According to an embodiment the degree of ETD fragmentation and/or subsequent PTR charge reduction of peptide ions comprising deuterium may be controlled, optimised, maximised or minimised. Similarly, the degree of hydrogen scrambling in peptide ions comprising deuterium prior to fragmentation of the ions by ETD and/or subsequent charge reduction by PTR may be controlled, optimised, maximised or minimised according to an embodiment of the present invention by varying, altering, increasing or decreasing one or more parameters (e.g. travelling wave velocity and/or amplitude) which affect the transmission of ions through the ion guide.

Although the preferred embodiment as described above relates to the use of a superbase reagent gas or vapour the present invention also extends to the use of non-superbase reagent gases or vapours and in particular the use of volatile amines such as trimethyl amine and triethyl amine. Accordingly, embodiments of the present invention are also contemplated wherein in the embodiments described above the superbase reagent gas is replaced with a volatile amine reagent gas.

Although the present invention has been described with reference to preferred embodiments, it will be understood by those skilled in the art that various changes in form and detail may be made without departing from the scope of the invention as set forth in the accompanying claims.

The invention claimed is:

1. A mass spectrometer comprising:

a first device arranged and adapted to react first ions with one or more neutral, Non-ionic or uncharged superbase reagent gases or vapours in order to reduce the charge state of said first ions, wherein said first device comprises a Proton Transfer Reaction Device; characterized in that:

said first device comprises a first ion guide comprising a plurality of electrodes, having at least one aperture wherein ions are transmitted, in use, through said apertures and wherein said one or more neutral, non-ionic or uncharged superbase reagent gases or vapours are selected from the group consisting of: (i) 1,1,3,3-Tetramethylguanidine ("TMG"); (ii) 2,3,4,6,7,8,9,10-Octahydropyrimidol[1,2-a]azepine {Synonym: 1,8-Diazabicyclo[5.4.01]undec-7-ene ("DBU")}; and (iii) 7-Methyl-1,5,7-triazabicyclo[4.4.01]dec-5-ene ("MTBD"){Synonym: 1,3,4,6,7,8-Hexahydro-1-methyl-2H-pyrimido[1,2-a]pyrimidine};

and in that said mass spectrometer further comprises:

an Electron Transfer Dissociation device arranged upstream of said first device, wherein said Electron Transfer Dissociation device comprises a second ion guide comprising a plurality of electrodes, wherein said second ion guide comprises a plurality of electrodes, having at least one aperture wherein ions are transmitted, in use, through said apertures; and a DC voltage device arranged and adapted to apply one or more first transient DC voltages or one or more first transient DC voltage waveforms to at least some of said plurality of electrodes comprising said first ion guide or said second ion guide in order to drive or urge at least some ions along and through at least a portion of the axial length of said first ion guide or said second ion guide.

2. A mass spectrometer as claimed in claim 1, wherein, in use, either: (i) protons are transferred from at least some of said first ions to said one or more neutral, non-ionic or uncharged superbase reagent gases or vapours; or (ii) protons are transferred from at least some of said first ions which comprise one or more multiply charged analyte cations or positively charged ions to said one or more neutral, non-ionic or uncharged superbase reagent gases or vapours whereupon at least some of said multiply charged analyte cations or positively charged ions are reduced in charge state.

3. A mass spectrometer as claimed in claim 1, wherein at least some parent or analyte ions are arranged to be fragmented, in use, in said Electron Transfer Dissociation device as said parent or analyte ions are transmitted through said second ion guide, wherein said parent or analyte ions comprise cations or positively charged ions.

4. A mass spectrometer as claimed in claim 2, wherein said Electron Transfer Dissociation device further comprises a control system which is arranged and adapted in a mode of operation to optimise or maximise the fragmentation of said parent or analyte ions as said analyte or parent ions pass through said second ion guide.

5. A mass spectrometer as claimed in claim 1, further comprising an ion mobility spectrometer or separator arranged upstream of said first device and downstream of said Electron Transfer Dissociation device, wherein said ion mobility spectrometer or separator comprises a third ion guide comprising a plurality of electrodes.

6. A mass spectrometer as claimed in claim 1, further comprising a RF voltage device arranged and adapted to apply a first RF voltage having a first frequency and a first amplitude to at least some of said plurality of electrodes of said first ion guide or said second ion guide such that, in use, ions are confined radially within said first ion guide or said second ion guide, wherein either:

(a) said first frequency is selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz; or (b) said first amplitude is selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak; or (c) in a mode of operation adjacent or neighbouring electrodes are supplied with opposite phase of said first RF voltage; or (d) said first ion guide or said second ion guide comprise 1-10, 10-20, 20-30, 30-40, 40-50, 50-60, 60-70, 70-80, 80-90, 90-100 or >100 groups of electrodes, wherein each group of electrodes comprises at least 1, 2, 3, 4, 5, 6, 7, 8, 9, 10, 11, 12, 13, 14, 15, 16, 17, 18, 19 or 20 electrodes and wherein at least 1, 2, 3, 4, 5, 6, 7, 8, 9, 10, 11, 12, 13, 14, 15, 16, 17, 18, 19 or 20 electrodes in each group are supplied with the same phase of said first RF voltage.

7. A mass spectrometer as claimed in claim 1, wherein either:

(a) at least 1%, 5%, 10%, 20%, 30%, 40%, 50%, 60%, 70%, 80%, 90%, 95% or 100% of said electrodes have substantially circular, rectangular, square or elliptical apertures; or (b) at least 1%, 5%, 10%, 20%, 30%, 40%, 50%, 60%, 70%, 80%, 90%, 95% or 100% of said electrodes have apertures which are substantially the same first size or which have substantially the same first area or at least 1%, 5%, 10%, 20%, 30%, 40%, 50%, 60%, 70%, 80%, 90%, 95% or 100% of said electrodes have apertures which are substantially the same second different size or which have substantially the same second different area; or (c) at least 1%, 5%, 10%, 20%, 30%, 40%, 50%, 60%, 70%, 80%, 90%, 95% or 100% of said electrodes have apertures which become progressively larger or smaller in size or in area in a direction along the axis of said ion guide; or (d) at least 1%, 5%, 10%, 20%, 30%, 40%, 50%, 60%, 70%, 80%, 90%, 95% or 100% of said electrodes have apertures having internal diameters or dimensions selected from the group consisting of: (i) ≤1.0 mm; (ii) ≤2.0 mm; (iii) ≤3.0 mm; (iv) ≤4.0 mm; (v) ≤5.0 mm; (vi) ≤6.0 mm; (vii) ≤7.0 mm; (viii) ≤8.0 mm; (ix) ≤9.0 mm; (x) ≤0 mm; and (xi) >10.0 mm; or (e) at least 1%, 5%, 10%, 20%, 30%, 40%, 50%, 60%, 70%, 80%, 90%, 95% or 100% of said electrodes are spaced apart from one another by an axial distance selected from the group consisting of: (i) less than or equal to 5 mm; (ii) less than or equal to 4.5 mm; (iii) less than or equal to 4 mm; (iv) less than or equal to 3.5 mm; (v) less than or equal to 3 mm; (vi) less than or equal to 2.5 mm; (vii) less than or equal to 2 mm; (viii) less than or equal to 1.5 mm; (ix) less than or equal to 1 mm; (x) less than or equal to 0.8 mm; (xi) less than or equal to 0.6 mm; (xii) less than or equal to 0.4 mm; (xiii) less than or equal to 0.2 mm; (xiv) less than or equal to 0.1 mm; and (xv) less than or equal to 0.25 mm; or (f) at least some of said plurality of electrodes comprise apertures and wherein the ratio of the internal diameter or dimension of said apertures to the centre-to-centre axial spacing between adjacent electrodes is selected from the group consisting of: (i) <1.0; (ii) 1.0-1.2; (iii) 1.2-1.4; (iv) 1.4-1.6; (v) 1.6-1.8; (vi) 1.8-2.0; (vii) 2.0-2.2; (viii) 2.2-2.4; (ix) 2.4-2.6; (x) 2.6-2.8; (xi) 2.8-3.0; (xii) 3.0-3.2; (xiii) 3.2-3.4; (xiv) 3.4-3.6; (xv) 3.6-3.8; (xvi) 3.8-4.0; (xvii) 4.0-4.2; (xviii) 4.2-4.4; (xix) 4.4-4.6; (xx) 4.6-4.8; (xxi) 4.8-5.0; and (xxii) >5.0; or (g) the internal diameter of the apertures of said plurality of electrodes progressively increases or decreases and then progressively decreases or increases one or more times along the longitudinal axis of said first ion guide or said second ion guide; or (h) said plurality of electrodes define a geometric volume, wherein said geometric volume is selected from the group consisting of: (i) one or more spheres; (ii) one or more oblate spheroids; (iii) one or more prolate spheroids; (iv) one or more ellipsoids; and (v) one or more scalene ellipsoids; or (i) said first ion guide or said second ion guide has a length selected from the group consisting of: (i) <20 mm; (ii) 20-40 mm; (iii) 40-60 mm; (iv) 60-80 mm; (v) 80-100 mm; (vi) 100-120 mm; (vii) 120-140 mm; (viii) 140-160 mm; (ix) 160-180 mm; (x) 180-200 mm; and (xi) >200 mm; or (j) said first ion guide or said second ion guide comprises at least: (i) 1-10 electrodes; (ii) 10-20 electrodes; (iii) 20-30 electrodes; (iv) 30-40 electrodes; (v) 40-50 electrodes; (vi) 50-60 electrodes; (vii) 60-70 electrodes; (viii) 70-80 electrodes; (ix) 80-90 electrodes; (x) 90-100 electrodes; (xi) 100-110 electrodes; (xii) 110-120 electrodes; (xiii) 120-130 electrodes; (xiv) 130-140 electrodes; (xv) 140-150 electrodes; (xvi) 150-160 electrodes; (xvii) 160-170 electrodes; (xviii) 170-180 electrodes; (xix) 180-190 electrodes; (xx) 190-200 electrodes; and (xxi) >200 electrodes; or (k) at least 1%, 5%, 10%, 20%, 30%, 40%, 50%, 60%, 70%, 80%, 90%, 95% or 100% of said plurality of electrodes have a thickness or axial length selected from the group consisting of: (i) less than or equal to 5 mm; (ii) less than or equal to 4.5 mm; (iii) less than or equal to 4 mm; (iv) less than or equal to 3.5 mm; (v) less than or equal to 3 mm; (vi) less than or equal to 2.5 mm; (vii) less than or equal to 2 mm; (viii) less than or equal to 1.5 mm; (ix) less than or equal to 1 mm; (x) less than or equal to 0.8 mm; (xi) less than or equal to 0.6 mm; (xii) less than or equal to 0.4 mm; (xiii) less than or equal to 0.2 mm; (xiv) less than or equal to 0.1 mm; and (xv) less than or equal to 0.25 mm; or (l) the pitch or axial spacing of said plurality of electrodes progressively decreases or increases one or more times along the longitudinal axis of said first ion guide or said second ion guide.

8. A mass spectrometer as claimed in claim 1, wherein: (a) a static ion-neutral gas reaction region or reaction volume is formed or generated in said first ion guide; or (b) a dynamic or time varying ion-neutral gas reaction region or reaction volume is formed or generated in said first ion guide.

9. A mass spectrometer as claimed in claim 1, further comprising a device arranged and adapted either:

(a) to maintain said first ion guide or said second ion guide in a mode of operation at a pressure selected from the group consisting of: (i) <100 mbar; (ii) <10 mbar; (iii) <1 mbar; (iv) <0.1 mbar; (v) <0.01 mbar; (vi) <0.001 mbar; (vii) <0.0001 mbar; and (viii) <0.00001 mbar; or (b) to maintain said first ion guide or said second ion guide in a mode of operation at a pressure selected from the group consisting of: (i) >100 mbar; (ii) >10 mbar; (iii)>1 mbar; (iv)>0.1 mbar; (v)>0.01 mbar; (vi)>0.001 mbar; and (vii)>0.0001 mbar; or (c) to maintain said first ion guide or said second ion guide in a mode of operation at a pressure selected from the group consisting of: (i) 0.0001-0.001 mbar; (ii) 0.001-0.01 mbar; (iii) 0.01-0.1 mbar; (iv) 0.1-1 mbar; (v) 1-10 mbar; (vi) 10 -100 mbar; and (vii) 100-1000 mbar.

10. A mass spectrometer as claimed in claim 1, wherein:

(a) in a mode of operation ions are arranged and adapted to be trapped but not substantially fragmented or reacted or charge reduced within said first ion guide or said second ion guide; or (b) in a mode of operation ions are arranged and adapted to be collisionally cooled or substantially thermalised within said first ion guide or said second ion guide; or (c) in a mode of operation ions are arranged and adapted to be substantially fragmented or reacted or charge reduced within said first ion guide or said second ion guide; or (d) in a mode of operation ions are arranged and adapted to be pulsed into or out of said first ion guide or said second ion guide by means of one or more electrodes arranged at the entrance or exit of said first ion guide or said second ion guide.

11. A mass spectrometer as claimed in claim 1, further comprising either:

(a) an ion source arranged upstream of said first device, wherein said ion source is selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; and (xx) a Glow Discharge ("GD") ion source; or (b) one or more continuous or pulsed ion sources; or (c) one or more ion guides arranged upstream or downstream of said first device; or (d) one or more ion mobility separation devices or one or more Field Asymmetric Ion Mobility Spectrometer devices arranged upstream or downstream of said first device; or (e) one or more ion traps or one or more ion trapping regions arranged upstream or downstream of said first device; or (f) one or more collision, fragmentation or reaction cells arranged upstream or downstream of said first device, wherein said one or more collision, fragmentation or reaction cells are selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation)("EID") fragmentation device; or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; or (h) one or more energy analysers or electrostatic energy analysers arranged upstream or downstream of said first device; or (i) one or more ion detectors arranged upstream or downstream of said first device; or (j) one or more mass filters arranged upstream or downstream of said first device, wherein said one or more mass filters are selected from the group consisting of: (i)a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wein filter; or (k) a device or ion gate for pulsing ions into said first device; or (l) a device for converting a substantially continuous ion beam into a pulsed ion beam.

12. A mass spectrometer as claimed in claim 1, further comprising:

(a) one or more Atmospheric Pressure ion sources for generating analyte ions or reagent ions; or (b) one or more Electrospray ion sources for generating analyte ions or reagent ions; or (c) one or more Atmospheric Pressure Chemical ion sources for generating analyte ions or reagent ions; or (d) one or more Glow Discharge ion sources for generating analyte ions or reagent ions.

13. A mass spectrometer as claimed in claim 1, wherein said mass spectrometer further comprises:

a C-trap; and a mass analyser comprising an outer barrel-like electrode and a coaxial inner spindle-like electrode;

wherein in a first mode of operation ions are transmitted to said C-trap and are then injected into said mass analyser; and wherein in a second mode of operation ions are transmitted to said C-trap and then to a collision cell or Electron Transfer Dissociation device wherein at least some ions are fragmented into fragment ions, and wherein said fragment ions are then transmitted to said C-trap before being injected into said mass analyser.

14. A mass spectrometer as claimed in claim 1, wherein the spacing of said electrodes increases along the length of the ion path, and wherein the apertures in the electrodes in an upstream section of said ion guide have a first diameter and wherein the apertures in the electrodes in a downstream section of said ion guide have a second diameter which is smaller than said first diameter, and wherein opposite phases of an RF voltage are applied, in use, to successive electrodes.

15. A method of mass spectrometry comprising:

providing a first device comprising a first ion guide including a Proton Transfer Reaction Device and reacting first ions with one or more neutral, non-ionic or uncharged superbase reagent gases or vapours in order to reduce the charge state of said first ions;

characterized in that:

said first device comprises a plurality of electrodes having at least one aperture wherein ions are transmitted through said apertures;

said one or more neutral, non-ionic or uncharged superbase reagent gases or vapours are selected from the group consisting of: (i)1,1,3,3-Tetramethylguanidine ("TMG"); (ii) 2,3,4,6,7,8,9,10-Octahydropyrimidol[1, 2-a]azepine {Synonym: 1,8-Diazabicyclo[5.4.01]undec-7-ene ("DBU")}; and (iii) 7-Methyl-1,5,7-triazabicyclo[4.4.01]dec-5-ene ("MTBD"){Synonym: 1,3,4,6,7,8-Hexahydro-1-methyl-2H-pyrimido [1,2-a] pyrimidine};

and in that said method further comprises:

providing an Electron Transfer Dissociation device upstream of said first device, wherein said Electron Transfer Dissociation device comprises a second ion guide comprising a plurality of electrodes, wherein said second ion guide comprises a plurality of electrodes having at least one aperture wherein ions are transmitted through said apertures; and applying one or more first transient DC voltages or one or more first transient DC voltage waveforms to at least some of said plurality of electrodes comprising said first ion guide and said second ion guide in order to drive or urge at least some ions along and through at least a portion of the axial length of said first ion guide and said second ion guide.

* * * * *